(12) United States Patent
Cho et al.

(10) Patent No.: US 9,383,775 B2
(45) Date of Patent: Jul. 5, 2016

(54) ICON DISPLAY METHOD FOR A PULL-OUT DISPLAY DEVICE

(75) Inventors: Eunhyung Cho, Seoul (KR); Hyorim Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1069 days.

(21) Appl. No.: 13/368,115

(22) Filed: Feb. 7, 2012

(65) Prior Publication Data

US 2013/0201208 A1 Aug. 8, 2013

(51) Int. Cl.
| | |
|---|---|
| G06F 3/048 | (2013.01) |
| G06F 1/16 | (2006.01) |
| G06F 3/14 | (2006.01) |
| G09G 3/20 | (2006.01) |
| G06F 3/0488 | (2013.01) |
| G09F 9/30 | (2006.01) |
| H04M 1/02 | (2006.01) |
| G06F 3/0481 | (2013.01) |

(52) U.S. Cl.
CPC ............ G06F 1/1652 (2013.01); G06F 3/0488 (2013.01); G06F 3/04817 (2013.01); G06F 3/1431 (2013.01); G09F 9/301 (2013.01); G09G 3/20 (2013.01); H04M 1/0268 (2013.01); G06F 2203/04803 (2013.01); G09G 2320/08 (2013.01); G09G 2340/0442 (2013.01); G09G 2354/00 (2013.01); G09G 2360/04 (2013.01); G09G 2380/02 (2013.01)

(58) Field of Classification Search
None
See application file for complete search history.

(56) References Cited

U.S. PATENT DOCUMENTS

| | | | | |
|---|---|---|---|---|
| 8,208,248 | B2* | 6/2012 | Koenig | 361/679.04 |
| 8,253,650 | B2* | 8/2012 | Sip et al. | 345/1.3 |
| 8,405,571 | B2* | 3/2013 | Chung | 345/1.1 |
| 8,581,939 | B2* | 11/2013 | Abe | 345/660 |
| 8,619,004 | B2* | 12/2013 | Choi | 345/1.3 |
| 8,866,840 | B2* | 10/2014 | Dahl et al. | 345/619 |
| 2005/0237699 | A1* | 10/2005 | Carroll | 361/600 |
| 2006/0176243 | A1* | 8/2006 | Yeh | G06F 1/1624 345/30 |
| 2007/0111803 | A1* | 5/2007 | Moro et al. | 463/43 |
| 2008/0303782 | A1* | 12/2008 | Grant et al. | 345/156 |
| 2009/0051830 | A1* | 2/2009 | Matsushita | G02F 1/133305 348/836 |
| 2010/0030641 | A1* | 2/2010 | Ibenforth | 705/14.49 |
| 2010/0162128 | A1* | 6/2010 | Richardson et al. | 715/744 |
| 2010/0207901 | A1* | 8/2010 | Shin | 345/173 |
| 2010/0293502 | A1* | 11/2010 | Kang et al. | 715/803 |
| 2011/0001715 | A1* | 1/2011 | Cha et al. | 345/173 |
| 2011/0022203 | A1* | 1/2011 | Woo et al. | 700/94 |
| 2011/0143815 | A1* | 6/2011 | Inami | 455/566 |
| 2012/0005602 | A1* | 1/2012 | Anttila et al. | 715/761 |

(Continued)

OTHER PUBLICATIONS

Future os Screen-Experience Video by TAT-Mobile USer Interface Blog, Published Sep. 1, 2010. 5 pages.*

*Primary Examiner* — Hien Duong
(74) *Attorney, Agent, or Firm* — Birch, Stewart, Kolasch & Birch, LLP

(57) ABSTRACT

A display device that incorporates a supplemental display screen that is stored within a main body of the display device must be able to transition objects displayed on a main display to a supplemental display. As the supplemental display is pulled out from storage within the main body of the display device, objects that were displayed on the main display may be transitioned onto the supplemental display. Various methods for transitioning the display of objects on the main display to the supplemental display are discussed, where methods may take into account the length of the supplemental display that is pulled out from storage and also touch input contacts that are made on either one of the displays.

19 Claims, 22 Drawing Sheets

(56) References Cited

U.S. PATENT DOCUMENTS

2012/0084737 A1* 4/2012 Gimpl et al. .................. 715/863
2012/0127061 A1* 5/2012 Pegg .............................. 345/1.1
2013/0055119 A1* 2/2013 Luong ........................... 715/764
2013/0080957 A1* 3/2013 Sirpal et al. ................... 715/769
2014/0250357 A1* 9/2014 Ryu et al. ...................... 715/205

* cited by examiner

FIG. 2D
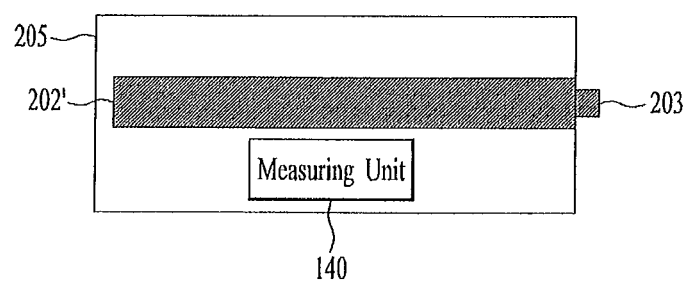
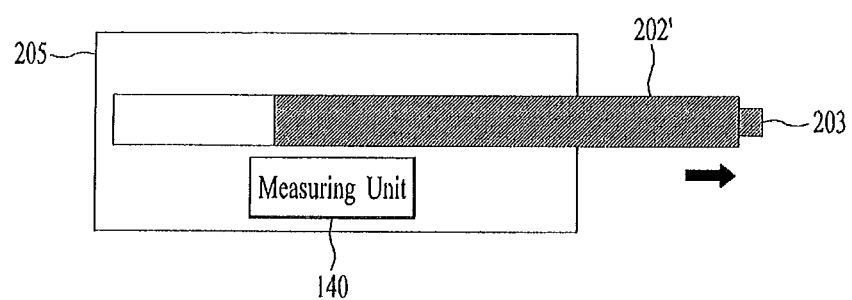

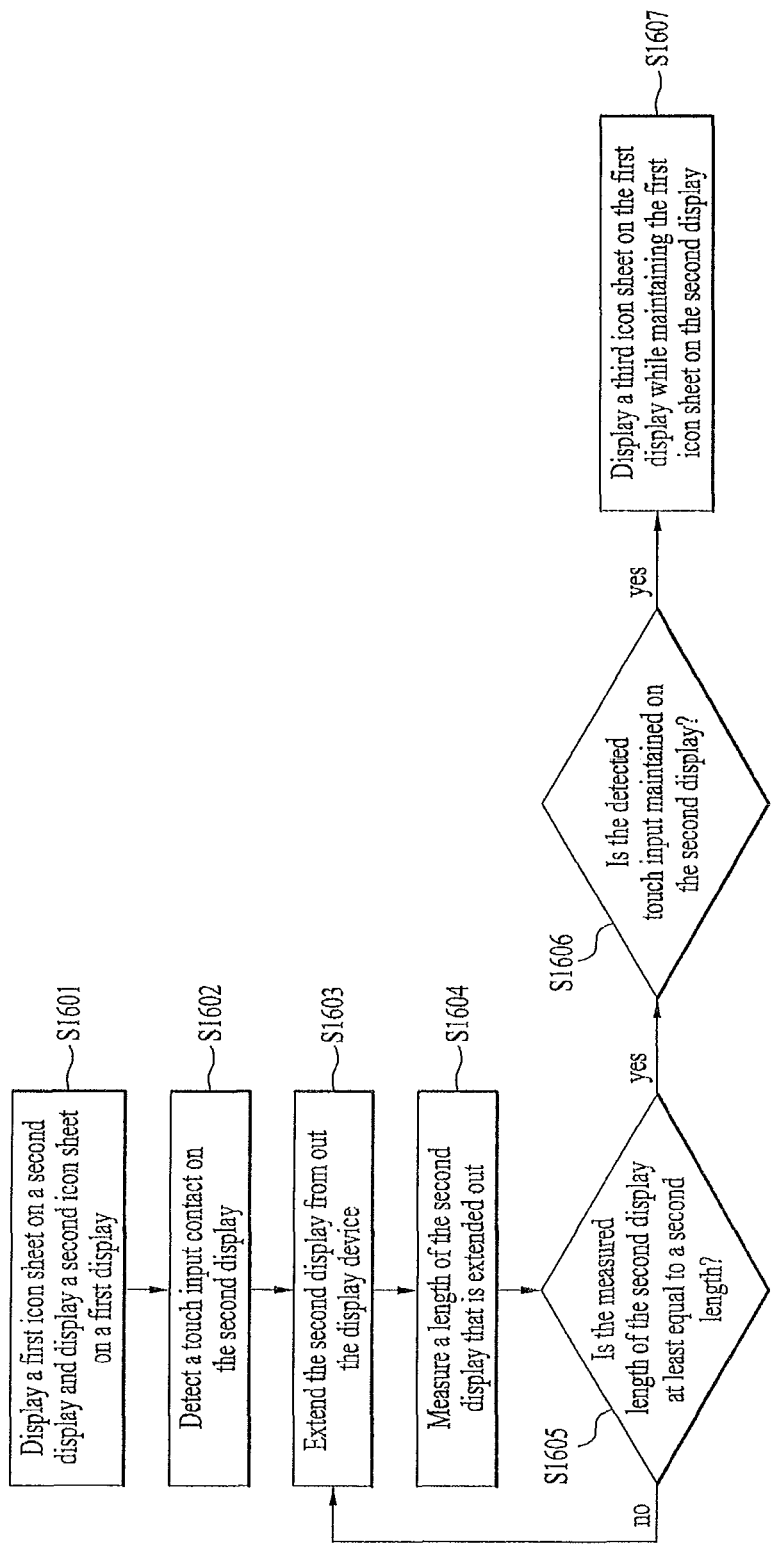

ICON DISPLAY METHOD FOR A PULL-OUT DISPLAY DEVICE

BACKGROUND OF THE INVENTION

Portable display devices have come to play an important role in many people's lives. Examples of portable display devices being used today include mobile phones, portable gaming devices, personal digital assistants (PDAs), portable navigation systems and portable video players to name a few.

To emphasize the portability of these display devices, the trend has been to make new portable display devices smaller in size. The obvious trade off for making smaller portable display devices that are easier to carry around is that the display screen size has been sacrificed. Consumers are then left with the choice of sacrificing portability for a larger screen size, or sacrificing screen size for increased portability.

Therefore there is a need for a portable display device that is able to both maintain its portability while minimizing the sacrifice in display screen size. To achieve this goal, various types of flexible display screens have been introduced for use on portable display devices where the shape of the display screen is able to be deformed. By allowing the shape of the display screen to be deformed, this allows for the display screen to be enlarged or decreased depending on the situation while still maintaining a minimal overall size of the portable display device. One such example is a portable display device that employs a rollable type flexible display screen.

It follows that for each type of flexible display screen, a unique user interface is required to handle the unique physical properties of the particular flexible display screen.

SUMMARY OF THE INVENTION

Accordingly, the present invention is directed to a portable display device that incorporates a flexible display being housed within the portable display device. The flexible display provides an additional display screen in addition to a main display found on the body of the display device. With the additional display screen provided by the flexible display, new methods for handling the display of sheets of application executing icons between the main display and the flexible display are needed. Therefore it is an object of the present invention to substantially resolve the limitations and deficiencies of the related art when it comes to controlling the display of sheets of application executing icons between a main display and an additional flexible display.

To achieve this objective, the present invention is directed to a display device capable enacting a method of controlling a display of a plurality of icon sheets on a display device with a first display and a second display, the method comprising: displaying a first icon sheet on the first display; exposing the second display for display; measuring a length of the second display that is exposed for display, and displaying a second icon sheet on the second display while maintaining the display of the first icon sheet on the first display, when the measured length of the second display that is exposed is a first length.

Preferably, the first length is at least equal to a width length of the first display.

More preferably, only a portion of the second icon sheet is displayed on the second display when the measured length of the second display that is exposed is less than the first length.

Preferably, the second display is stored within a housing unit and pulled out from within the housing unit.

Preferably, the method further comprises: displaying a third icon sheet on the second display when the second display is exposed to a second length, and maintaining the display of the first icon sheet on the first display.

More preferably, the second length is at least equal to twice a width length of the first display.

Preferably, the method further comprises: detecting a touch input contact on the first display, and displaying a second icon sheet on the second display while maintaining the display of the first icon sheet on the first display, when the second display is exposed to the first length and the touch input contact is continually detected on the first display until the second display is extended out from within the display device to the first length.

Preferably, the method further comprises: displaying an indicator on the first display configured to indicate the first icon sheet is displayed on the first display out of a total number of available icon sheets.

More preferably, the indicator is only displayed on the first display.

More preferably, the indicator further indicates a number of currently displayed icon sheets.

To further achieve the objectives described above, the present invention further provides an embodiment that discloses a method of controlling a display of a plurality of icon sheets on a display device with a first display and a second display, the method comprising: displaying a first icon sheet on the first display; exposing the second display; measuring a length of the second display that is exposed for display, and displaying the first icon sheet on the second display when the measured length of the second display that is exposed is a first length.

Preferably, the first length is at least equal to a width length of the first display.

Preferably, the method further comprises: displaying a third icon sheet on the first display when the second display is further exposed to a second length, and maintaining the display of the first icon sheet on the second display.

Preferably, the method further comprises: detecting a touch input contact on the second display, wherein the touch input contact overlaps the display of the first icon sheet, and displaying a third icon sheet on the first display while maintaining the display of the first icon sheet on the second display, when the second display is exposed a second length and the touch input contact is continually detected on the second display until the second display is extended out from within the display device to the second length.

More preferably, the second length is at least equal to twice a width length of the first display.

To further achieve the objectives of the present invention, the present invention is also directed to a display device, the display device comprising: a first display on a body of the display device, the first display configured to display a first icon sheet; a second display; a measuring unit configured to measure a length of the second display that is exposed for display, and a processor configured to control the second display to display a second icon sheet when the second display is exposed to a first length.

Preferably, the first length is at least equal to a width length of the first display.

Preferably, the second display is housed within a housing unit, and the second display is exposed by pulling the second display out from within the housing unit.

Preferably, the display device further comprises: a touch detecting unit configured to detect a touch input contact on the first display, and the processor is further configured to control the second display to display a second icon sheet on the second display while maintaining the display of the first icon sheet on the first display, when the measured length of the second display that is exposed is at least equal to the first length and the touch detecting unit continually detects the touch input contact on the first display until the second display is exposed to the first length.

To further achieve the objectives of the present invention, the present invention is also directed to a display device, the display device comprising: a first display on a body of the display device, the first display configured to display a first icon sheet; a second display; a measuring unit configured to measure a length of the second display that is extended out from within the housing unit, and a processor configured to control the second display to display the first icon sheet when the second display is exposed to a first length.

Preferably, the first length is at least equal to a width length of the first display.

Preferably, the second display is housed within a housing unit, and the second display is exposed by pulling the second display out from within the housing unit.

Preferably, the display device further comprises: a touch input detecting unit configured to detect a touch input contact on the second display, wherein the touch input contact overlaps the display of the first icon sheet, and the processor is further configured to control the first display to display a third icon sheet on the first display while maintaining the display of the first icon sheet on the second display, when the measured length of the second display that is exposed is at least equal to a second length and the touch input detecting unit continually detects the touch input contact on the second display until the second display is exposed to the second length.

BRIEF DESCRIPTION OF THE DRAWINGS

FIG. 2D illustrates an inner workings view of a display device, according to some embodiments of the present invention;

FIG. 16 illustrates a flowchart describing an exemplary set of steps for a method, according to some embodiments of the present invention.

DETAILED DESCRIPTION OF THE DRAWINGS

Reference will now be made in detail to exemplary embodiments of the present invention, examples of which are illustrated in the accompanying drawings. It will be apparent to one of ordinary skill in the art that in certain instances of the following description, the present invention is described without the specific details of conventional details in order to avoid unnecessarily distracting from the present invention. Wherever possible, like reference designations will be used throughout the drawings to refer to the same or similar parts. All mention of a display device is to be understood as being made to a display device of the present invention unless specifically explained otherwise.

It should also be understood that, although the terms first, second, etc. may be used throughout the following description to describe various elements of the present invention, these elements should not be limited to these terms. The numerical ordering terms first, second, etc. are used to represent relevant ordering of the various elements. For example, a first icon sheet may be the actual first icon sheet among a plurality of icon sheets, or alternatively the first icon sheet may simply be an icon sheet that, relatively speaking, precedes a second icon sheet.

Figure 1:
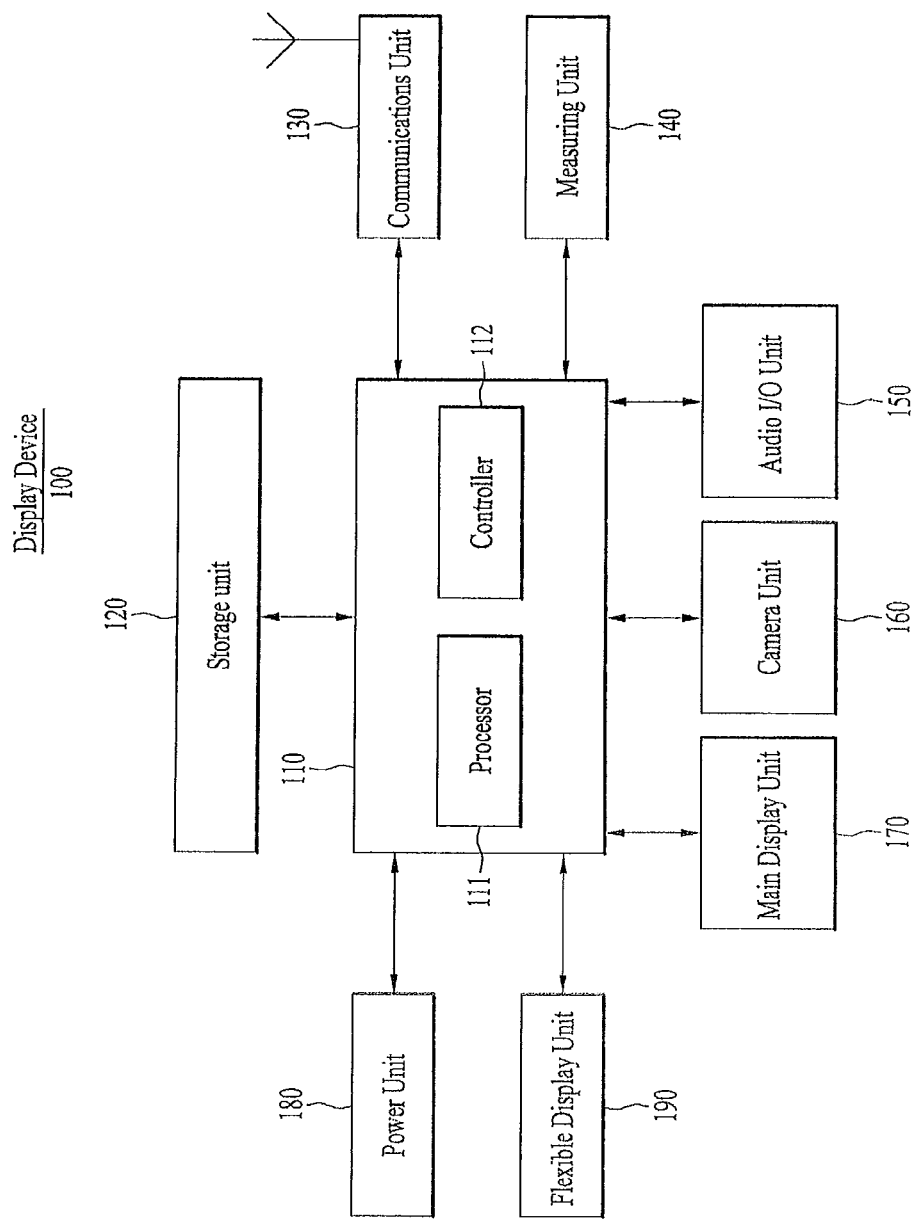
FIG. 1 illustrates a block diagram including components of a display device, according to some embodiments of the present invention.

FIG. 1 illustrates a general architecture block diagram for a display device 100 according to some embodiments of the present invention. The display device 100 illustrated in FIG. 1 may, for example, be a mobile telecommunications device, notebook computer, tablet computing device, portable navigation device, portable video player or personal digital assistant (PDA). It is to be appreciated that it is within the scope of the present invention to utilize display devices that may include a fewer, or greater, number of components than what is expressly illustrated in FIG. 1. As illustrated in FIG. 1, the display device 100 includes a processor 111, a controller 112, a storage unit 120, a communications unit 130, a measuring unit 140, an audio input/output (I/O) unit 150, a camera unit 160, a main display unit 170, a power unit 180 and a flexible display unit 190. The processor 111 and the controller 112 may be part of a single chip set 110 as illustrated in FIG. 1, or alternatively may be part of separate chip sets. Alternatively, the display device may only be comprised of only a processor 111 that incorporates the functionality of the controller 112 according to some embodiments of the present invention.

Although not specifically illustrated in FIG. 1, components of the display device 100 are able to communicate with each other via one or more communication buses or signal lines. It should also be appreciated that the components of the display device 100 may be implemented as hardware, software, or a combination of both hardware and software (e.g. middleware).

The storage unit 120 illustrated in FIG. 1 may include non-volatile type memory such as non-volatile random-access memory (NVRAM) or electrically erasable programmable read-only memory (EEPROM), commonly referred to as flash memory. The storage unit 120 may also include other forms of high speed random access memory such as dynamic random-access memory (DRAM) and static random-access memory (SRAM), or may include a magnetic hard disk drive (HDD). In cases where the flexible display device is a mobile communication device, the storage unit 120 may additionally include a subscriber identity module (SIM) card for storing a user's profile information.

The storage unit 120 is tasked with storing various data, instructions and applications that are needed to operate the display device. As will be described in more detail throughout this description, the display device of the present invention employs a touch sensitive main display and a touch sensitive flexible display. By providing visual objects and cues on the touch sensitive main display and flexible display, a user is provided with a touch sensitive user interface (UI) for interacting and controlling the display device. It stands then that the set of instructions corresponding to the touch sensitive UI required for detecting and interpreting the touch input contacts on the touch sensitive displays are stored within the storage unit 120. And during the operation of the display device, the processor 111 is tasked with processing the set of instructions corresponding to the touch sensitive UI and controlling the various components of the display device 100 according to the detected touch inputs.

Individual applications may also be stored on the storage unit 120 as embodied by a set of specific instructions to be processed by the processor 111 in order to execute the application on the display device 100. Some examples of applications that may be stored on the storage unit 120 include e-mail applications, video viewing applications, audio playing applications, web browsing applications, and gaming applications.

In some embodiments of the present invention, the storage unit 120 may further include access to remote storage in a cloud storage computing environment. The remote storage may be accessed via the communications unit 130.

The communications unit 130, as illustrated in FIG. 1, may include RF circuitry that allows for wireless access to outside communications networks such as the Internet, Local Area Networks (LANs), Wide Area Networks (WANs) and the like. The wireless communications networks accessed by the communications unit 130 may follow various communications standards and protocols including, but not limited to, Global System for Mobile Communications (GSM), Enhanced Data GSM Environment (EDGE), code division multiple access (CDMA), wideband code division multiple access (W-CDMA), time division multiple access (TDMA), Bluetooth, Wireless Fidelity (Wi-Fi), Short Message Service (SMS) text messaging and any other relevant communications standard or protocol that allows for wireless communication by the display device 100. In some embodiments of the present invention, the communications unit 130 may also include a tuner for allowing for the reception of broadcast signals according to, for example, the digital multimedia broadcasting (DMB), digital video broadcasting technologies, advanced television systems committee (ATSC), integrated services digital broadcasting (ISDB) or digital terrestrial multimedia broadcast (DTMB) standards.

Additionally, the communications unit 130 may include various input and output interfaces (not shown) for allowing wired data transfer communication between the display device 100 and an external electronics device. The interfaces may include, for example, interfaces that allow for data transfers according to the family of universal serial bus (USB) standards, the family of IEEE 1394 standards or other similar standards that relate to data transfer.

The measuring unit 140, illustrated in FIG. 1, is comprised of circuitry that allows the measuring unit 140 to measure the length of a flexible display that is pulled out from an inner display housing within the display device 100. The inner display housing may be constructed as a separate housing unit from the main body of the display device 100, or in some embodiments the inner display housing may simply be incorporated into the main body of the display device 100. A more detailed description of the measuring unit 140 will be provided later throughout this description.

The audio I/O unit 150 illustrated in FIG. 1 may include a speaker or headphone interface for outputting audio signals originating from the storage unit 120 of the display device 100. The audio I/O unit 150 may also include a microphone for inputting audio signals into the display device 100. Audio signals that are inputted to the display device 100 through the microphone are transmitted to the processor 111 for processing.

The camera unit 160 illustrated in FIG. 1 may include an RGB camera for capturing images. Images captured by the RGB camera may then be stored on the storage unit 120. The camera unit 160 may additionally include a depth sensing camera. The depth sensing camera is able to capture images and measure distances of objects that are captured based on sonar type technologies or infrared type technologies. Images captured by the camera unit 150 may be transmitted to the processor 111 for processing either prior to, or following, a storage on the storage unit 120.

The main display unit 170 is primarily comprised of a main display and a touch input detecting unit. Together with the touch input detecting unit, a main display of the display device may be considered to be a touch sensitive display, capable of detecting touch input contacts on its surface. In this way, the main display is able to provide an input and output UI for a user of the display device 100 to input commands and control objects displayed on the main display. It should be understood that all subsequent mention of a main display refers to the touch sensitive main display unless specifically noted otherwise.

Figure 2A:
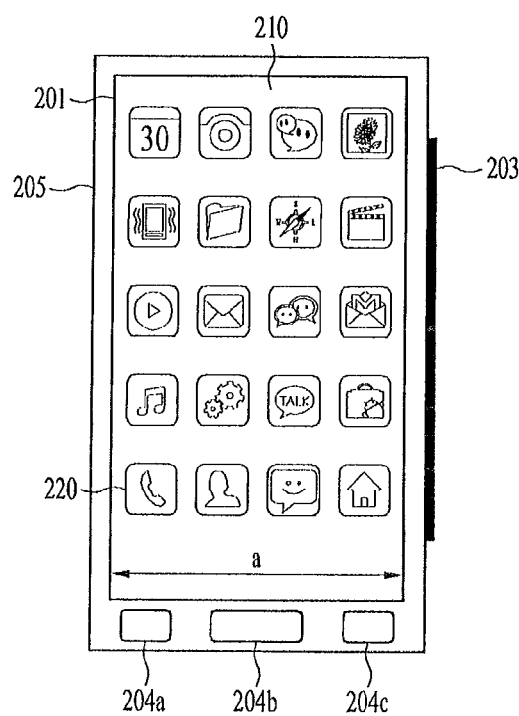
FIG. 2A illustrates a display device that is displaying an icon sheet filled with a plurality of icons on a touch sensitive main screen, according to some embodiments of the present invention.

For instance, a UI according to the present invention is seen to display a plurality of application icons 220 on a main display 201 of a display device in FIG. 2A. A user may then select an application for execution on the display device by applying a touch input on the touch sensitive main display 201 over the application's representing icon. The touch input may be comprised of a tap contact over the selected application, where the user's finger initiates contact on the main display and is then released within a short amount of time (e.g. less than 1 second). The contact of the touch input on the main display is then detected, and the processor 111 may begin the processing to execute the selected application. This is just one of many examples for a user of the touch sensitive user interface that will be described throughout this description.

The main display of the main display unit 170 may be implemented using liquid crystal display (LCD) technology that allows for a thin display screen and touch sensitive capabilities, although other similar display technologies such as organic light emitting diode (OLED) display technology, electroluminescent display (ELD) technology or electronic paper technology may be implemented in other embodiments of the present invention.

The power unit 180 illustrated in FIG. 1 is a power source for providing the power to operate the various components/units of the flexible display device 100. The power unit 180 may include a battery or an interface for providing power from external power sources (e.g. direct current adaptor, alternating current adaptor). The flexible display unit 190 illustrated in FIG. 1 is comprised primarily of a flexible display and a touch input detecting unit. Therefore, like the main display, a user's touch input contact on the flexible display may be detected. For at least this reason, it should be understood that all subsequent mention of the flexible display refers to a touch sensitive flexible display unless specifically noted otherwise.

The flexible display itself may be made using liquid crystal diode (LCD) technology or other similar display technology such as organic light emitting diode (OLED) display technology, electroluminescent display (ELD) technology or electronic paper technology that allows for a high degree of flexibility. As illustrated in FIG. 2C, the flexible display 202 is required to have a high degree of flexibility to ensure deformation of the flexible display 202 that will allow it to be stored within an inner display housing unit 207 of the display device 100. By being able to be physically deformed in order to be stored within the inner display housing unit 207, the flexible display 202 does not add to the overall size of the display device.

According to the present invention, multi-touch contacts may be detected on either one of the main display or flexible display.

FIG. 2A illustrates a display device according to the present invention in an initial state. In this initial state the main display 201 is prominently seen on the front side of the display device. Also visible from the front side are a variety of input keys 204a, 204b and 204c. In some embodiments the input keys 204a, 204b and 204c may be implemented as physical buttons. Alternatively, the input keys 204a, 204b and 204c may be implemented as touch input keys that are displayed as part of the main display 201 in other embodiments of the present invention. Input keys that are implemented as touch input keys may be displayed as needed, and then controlled to be taken off display when not needed, depending on the current state of the display device.

Also seen in FIG. 2A is a display device body 205 that generally describes an outer shell of the display device, and a handle 203 that is attached to a flexible display (as better illustrated in FIG. 2B) that is stored within the display device body 205. The main display 201 has a width length, a, that will be referenced throughout this description.

The present invention is concerned with a display device that is capable of storing various applications and subsequently running those applications on the display device. In order to provide an efficient user interface to a user of the display device, it is preferable to represent each application as an icon on the user interface. Subsequently, icons may be grouped together on "sheets" of the user interface for presentation to the user. FIG. 2A therefore illustrates the main display 201 displaying a sheet 210 of the user interface that includes a plurality of icons 220.

Figure 2B:
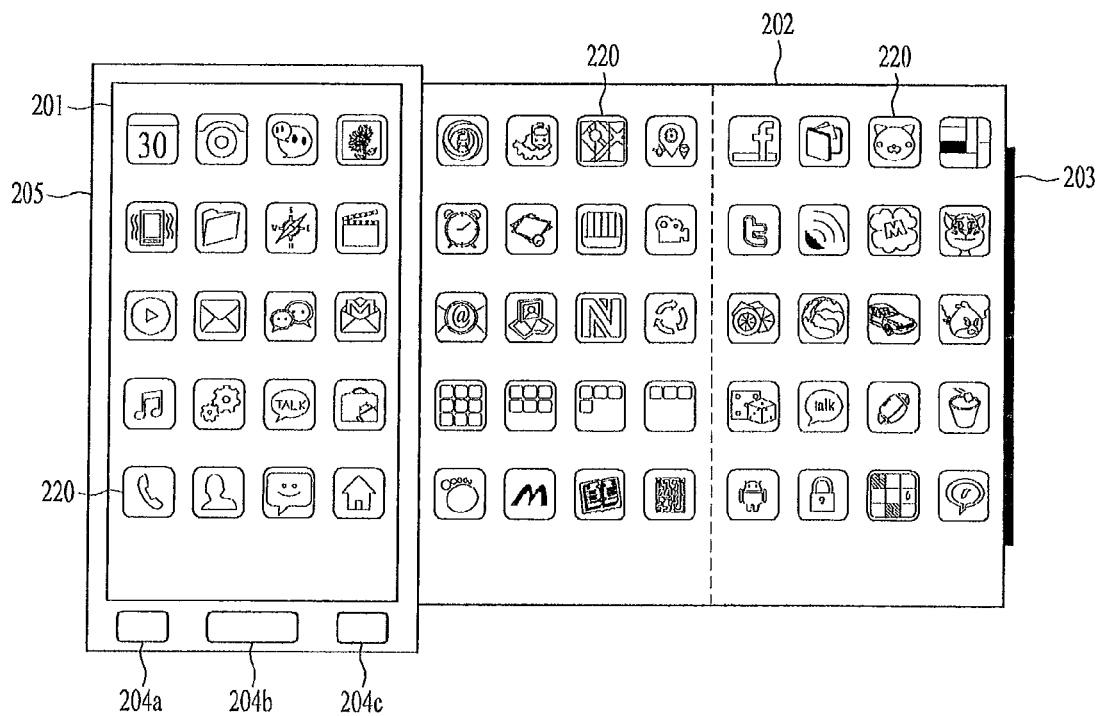
FIG. 2B illustrates a display device that is displaying a plurality of icon sheets on a touch sensitive main screen and a touch sensitive flexible screen that extends out from the display device, according to some embodiments of the present invention.
Figure 2C:
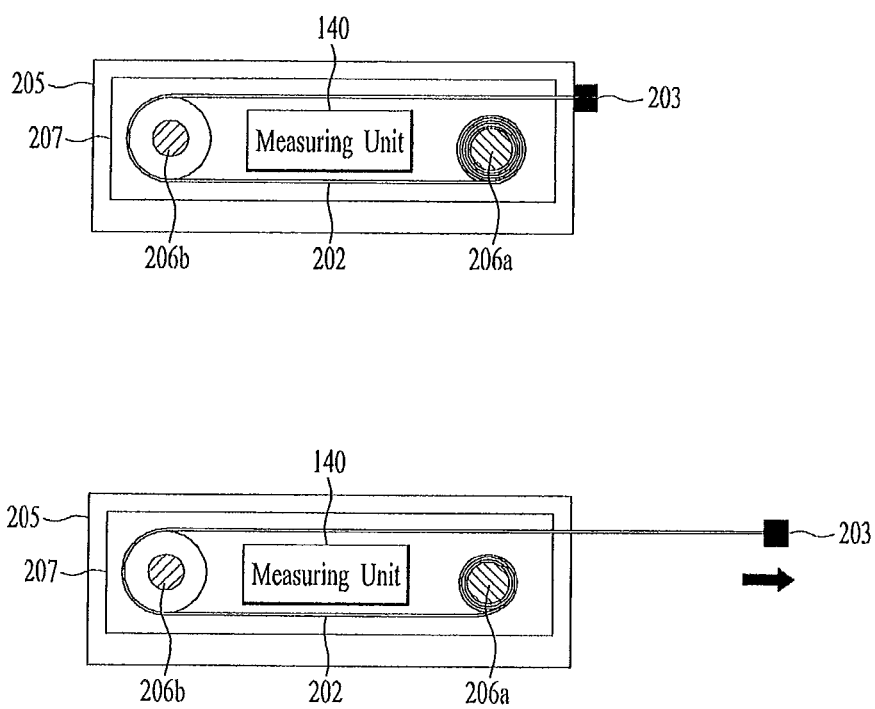
FIG. 2C illustrates an inner workings view of a display device, according to some embodiments of the present invention.

FIG. 2B then illustrates an extended state where the flexible display 202 has been pulled out from within the display device body 205. The extended state depicted in FIG. 2B may represent a maximum extension of the flexible display 202, where the maximum extension of the flexible display may be two times the width length, a, of the main display 201. Alternatively, the maximum extension of the flexible display 202 from the display device may be shorter or longer than two times the width length, a, of the main display 201.

In order to pull out the flexible display 202 from within the display device body 205, preferably a user will hold onto the handle 203 and pull on the handle 203 to pull the flexible display 202 out from within the display device body 205. Although FIG. 2A illustrates the handle 203 to be protruding from the outer edge of the display device body 205, in some embodiments the handle 203 may be constructed to lay flush with the outer edge of the display device body 205.

FIG. 2C illustrates the inner workings of the display device according to the present invention. Within the display device body 205, there is generally an inner display housing unit 207 that stores the flexible display 202. To aid with the pull out operation of the flexible display 202 from within the inner display housing unit 207, a main roller 206a and a guide roller 206b are provided. In the initial state where the flexible display 202 is fully maintained within the inner display housing unit 207, a portion of the flexible display 202 is seen to be wound around the main roller 206a. Then as the user pulls on the handle 203 to extend the flexible display 202 out of the inner display housing unit 207, the portion of the flexible display 202 that is wound around the main roller 206a is gradually unwound. During this pull-out process, the guide roller 206b serves to safely guide the flexible display 202 as it is bent and rolled over the guide roller 206b on its way to be pulled out of the inner display housing unit 207.

FIG. 2D illustrates an alternative type of flexible display 202'. Unlike the flexible display 202 illustrated in FIG. 2C, the alternative type of flexible display 202' is not wound up within the display device body 205. Instead, the alternative type of flexible display 202' simply slides out from within the display device body 205. In some embodiments, the alternative type of flexible display 202' that slides out from the display device body 205 may be limited in size to be approximately the width length, a, of the main display.

Meanwhile, the measuring unit 140 proceeds to measure a length of the flexible display 202 or 202' that is pulled out from the inner display housing unit 207. The measured length information is then transmitted to the processor 111 for processing.

Although not specifically illustrated, a brake mechanism may be part of the inner display housing unit 207 that provides a slight braking action when the flexible display 202 is pulled out to a length that is equal to the width length, a, of the main display 201. Alternatively, when the flexible display 202 is pulled out to a length that is equal to the width length, a, of the main display 201, a visual message may be provided on either the main display 201 or flexible display 202 indicating that the flexible display 202 has been pulled out to a length that is equal to the width length, a, of the main display 201.

Figure 3:
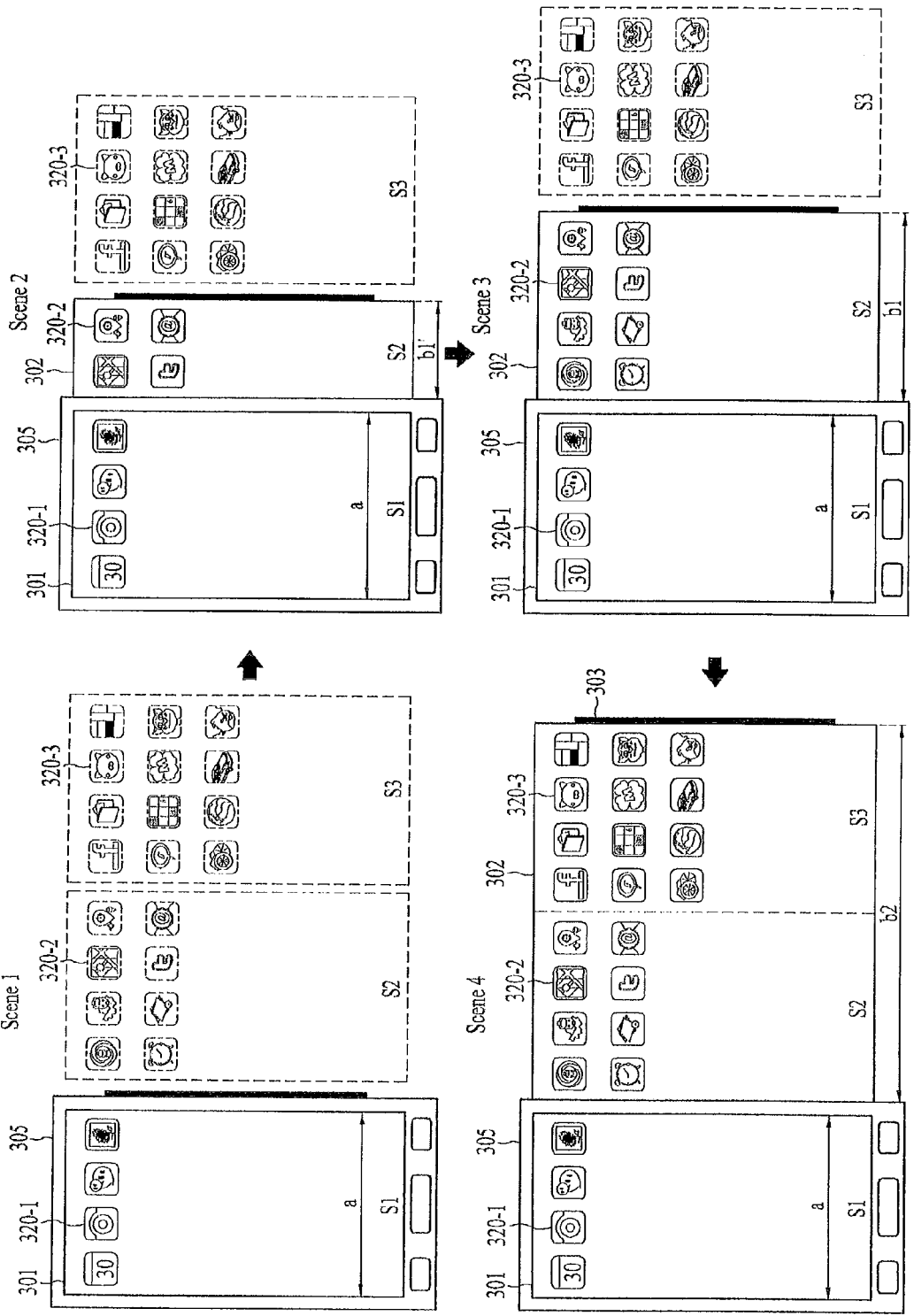
FIG. 3 illustrates a set of scenes that describe a method for displaying a plurality of icon sheets as a flexible display is extended from within the display device, according to some embodiments of the present invention.

As previously mentioned, it is an object of the present invention to provide a user with an efficient user interface that is capable of displaying sheets of icons between a main display and an extendable flexible display. FIG. 3 thus illustrates the presentation of a user interface according to some embodiments of the present invention for accomplishing these objectives.

Scene 1 illustrates a first icon sheet S1 displayed on the main display 301 of the display device. The first icon sheet S1 includes a plurality of application icons 320-1 that are displayed for presentation to the user. By contacting the display over the application icon (i.e. touch input), a user of the display device may activate the corresponding application for operation. For instance, the user may initiate a tap type touch input contact over the area of the main display that is displaying the application icon that the user wishes to activate. In turn, the user's touch input contact over the application icon will be detected and the processor 111 will proceed to process the appropriate application for running on the display device. It should be assumed that all application icons of the present invention may be activated in this way.

Now in addition to the first icon sheet S1 currently displayed on the main display 301, the user interface may additionally include a second icon sheet S2 and third icon sheet S3 that are part of the existing user interface, but not currently displayed due to a lack of available display space. Allowing for multiple icon sheets in the user interface is useful for a user that has downloaded a multitude of applications, where all application icons cannot fit on single icon sheet. Allowing for multiple icon sheets may also be useful for grouping application icons that belong to a similar genre on a common icon sheet. For example, application icons relating to games may be grouped on the first icon sheet S1, and application icons relating to text messaging services may be grouped separately on the second icon sheet S2.

In this case, each subsequent icon sheet S2 and S3 includes its own set of unique application icons 320-2 and 320-3, respectively. However, because scene 1 only anticipates having the main display 301 available for displaying the icon sheets, only the first icon sheet S1 can be displayed. Therefore, scene 1 illustrates icon sheets S2 and S3 with dashed lines to represent that icon sheets S2 and S3 exist within the user interface, but are not currently displayed by either the main display 301 or flexible display 302.

Scene 2 illustrates an in between step where the flexible display 302 has not yet been pulled out to a length where an entire icon sheet may be displayed on the flexible display 302. However, as the flexible display 302 is in the process of being pulled out, it is within the scope of some embodiments to allow the display of partial portions of an icon sheet that is to be displayed on the flexible display 302. So in the second scene of FIG. 3, the flexible display 302 has been pulled out to a length b1', where the length b1' is less than a width length, a, of the main display 301. And because the exposed amount of the flexible display 302 is able to support the display of, in this case, two columns of icons, the two rows of application icons 320-2 corresponding to the second icon sheet are displayed on the flexible display 302.

Although the rest of the embodiments described in this description do not specifically mention this in between step as illustrated in scene 2 of FIG. 3, it should be assumed that the other embodiments are capable of implementing such an in between step. Thus other embodiments may also allow the partial display of a next icon sheet to be displayed on the flexible display as the flexible display is being pulled out. The partial display of a next icon sheet may adaptively display columns of application icons as the space available on the flexible display allows.

Moving along, the third scene of FIG. 3 depicts the situation where the flexible display 302 has been pulled out to a first length, b1. This first length, b1, may be a length that is equal to at least the width length, a, of the main display 301. So once the flexible display 302 has been pulled out to the first length, b1, the flexible display 302 is made available for displaying an additional icon sheet. In this case, the flexible display 302 is shown to display the second icon sheet S2 when the flexible display has been pulled out to the first length. The third icon sheet S3 is still illustrated with dashed lines to represent that the third icon sheet S3 is still not currently displayed.

The fourth scene of FIG. 3 then depicts the situation where the flexible display 302 has been pulled out to a second length, b2. The second length, b2, may be a length that is equal to at least twice the width length, a, of the main display 301. So once the flexible display 302 has been pulled out to the second length, b2, there is enough space on the flexible display 302 made available for displaying two additional icon sheets. In this case, when the flexible display 302 is pulled out to the second length, b2, the flexible display 302 is able to display both the second icon sheet S2 and the third icon sheet S3.

Now according to the embodiment illustrated in FIG. 3, the first icon sheet S1 that is originally displayed on the main display 301 remains on the main display 301, while the remaining icon sheets S2 and S3 are eventually displayed on the flexible display 302 as the flexible display 302 is pulled out. Also, the order in which previously non-displayed icon sheets are transitioned onto the flexible display 302 as the flexible display 302 is pulled out may be made dependent on a numerical ordering hierarchy of the icon sheets. In this case, the numerical ordering hierarchy will allow a lower numbered icon sheet to be displayed prior to a higher numbered icon sheet. For instance when the flexible display 302 is pulled out to the first length, b1, the embodiment illustrated in FIG. 3 will display the second icon sheet S2 on the flexible display 302 before displaying the third icon sheet S3. The third icon sheet is not displayed on the flexible display 302 until the flexible display 302 is extended out to the second length, b2.

Figure 4:
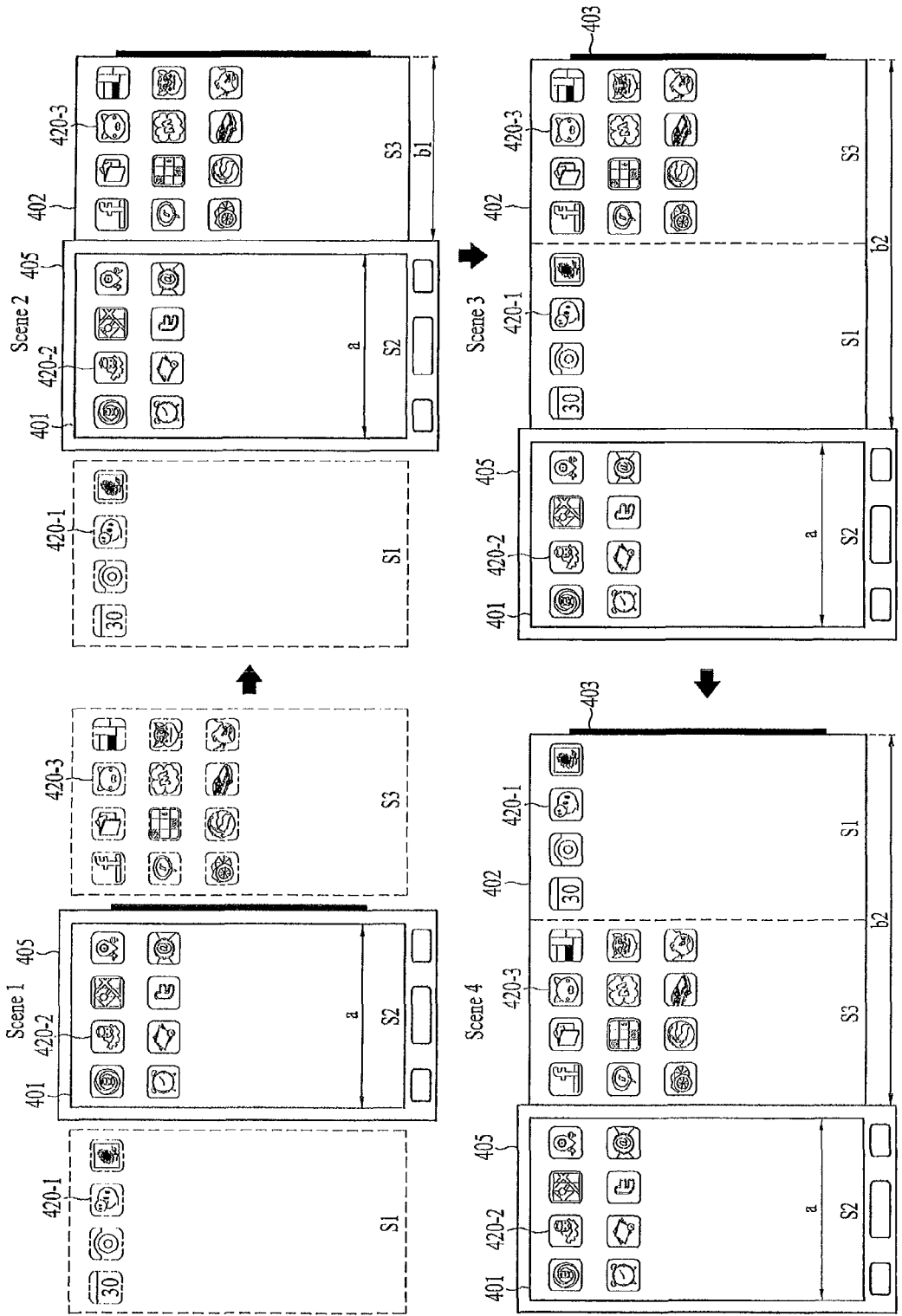
FIG. 4 illustrates an alternative set of scenes that describe a method for displaying a plurality of icon sheets as a flexible display is extended from within the display device, according to some embodiments of the present invention.

FIG. 4 illustrates the situation where a second icon sheet S2 is originally displayed on the main display 401 while a flexible display 402 remains stored within the display device body 405. In scene 1 the main display 401 is seen displaying the second icon sheet S2 that includes a plurality of application icons 420-2. Not expressly displayed on the main display 401, but existing in the user interface, are icon sheets S1 and S3. Icon sheets S1 and S3 include corresponding application icons 420-1 and 420-3, respectively. However, in scene 1 icon sheets S1 and S3 are represented by the dashed lines to acknowledge that icon sheets S1 and S3 exist within the user interface, but are not currently displayed.

The second scene of FIG. 4 depicts the flexible display 402 having been pulled out to a first length, b1, where the first length b1 is equal to at least the width length, a, of the main display 401. By pulling out the flexible display 402 to the first length, b1, additional display space is made available for displaying one of the remaining icon sheets S1 or S3. In this case, pulling out the flexible display 402 to the first length, b1, results in the display of the third icon sheet S3 on the flexible display 402 while the second icon sheet S2 remains displayed on the main display 401. It should be apparent that the third icon sheet S3 is transitioned to be displayed on the flexible display 402 instead of the first icon sheet S1 because the third icon sheet S3 is the next icon sheet following the second icon sheet S2 already displayed on the main display 401. This is in accordance to a progression of a numerical ordering hierarchy.

The third scene of FIG. 4 depicts the flexible display 402 having been pulled out to a second length, b2, where the second length is equal to at least two times the width length, a, of the main display 401. By pulling out the flexible display 402 to the second length, b2, additional display space is made available for displaying the remaining first icon sheet S1. In this case, pulling out the flexible display 402 to the second length, b2, results in the display of the first icon sheet S1 and the third icon sheet S3 on the flexible display 402 while the second icon sheet S2 remains displayed on the main display 401. It should be apparent that in this third scene of FIG. 4 the third icon sheet S3 is controlled to be displayed on the rightmost display area of the flexible display 402 while the first icon sheet 1 is controlled to be displayed on the leftmost display area of the flexible display 402. So in scene 3, the third icon sheet S3 that was previously displayed on the flexible display 402 when the flexible display 402 was pulled out to the first length, b1, remains in the same physical display area on the flexible display 402 as the flexible display 402 continued to be extended out further. Thus the change that comes with the flexible display 402 being pulled out to the second length, b2, is that the remaining first icon sheet S1 is displayed on the newly exposed display area of the flexible display 402.

Scene 4 of FIG. 4 illustrates an alternative embodiment for displaying the icon sheets on the flexible display 402 when the flexible display is extended to the second length, b2. In the alternative embodiment depicted in scene 4, instead of the third icon sheet S3 remaining within the same physical display area of the flexible display 402, the third icon sheet S3 is seen to remain in a display area that remains closest to the main display 401. So in the fourth scene, the display of the third icon sheet S3 is transitioned to remain at a position on the flexible display 402 that is closest to the main display 401, and the display of the remaining first icon sheet S1 is controlled to be displayed in the display area that is further away from the main display 401.

In this way, scene 4 provides an alternative method for handling the display of the icon sheets as the flexible display 402 is pulled out from the display device body 405 than is provided in scene 3. In both scene 3 and scene 4, the second icon sheet that is originally displayed on the main display 401 remains on the main display 401 as the flexible display 402 is pulled out from the display device body 405. Preferably, a user will hold onto the handle 403 when pulling the flexible display 402 out from within the display device body 405.

Figure 5:
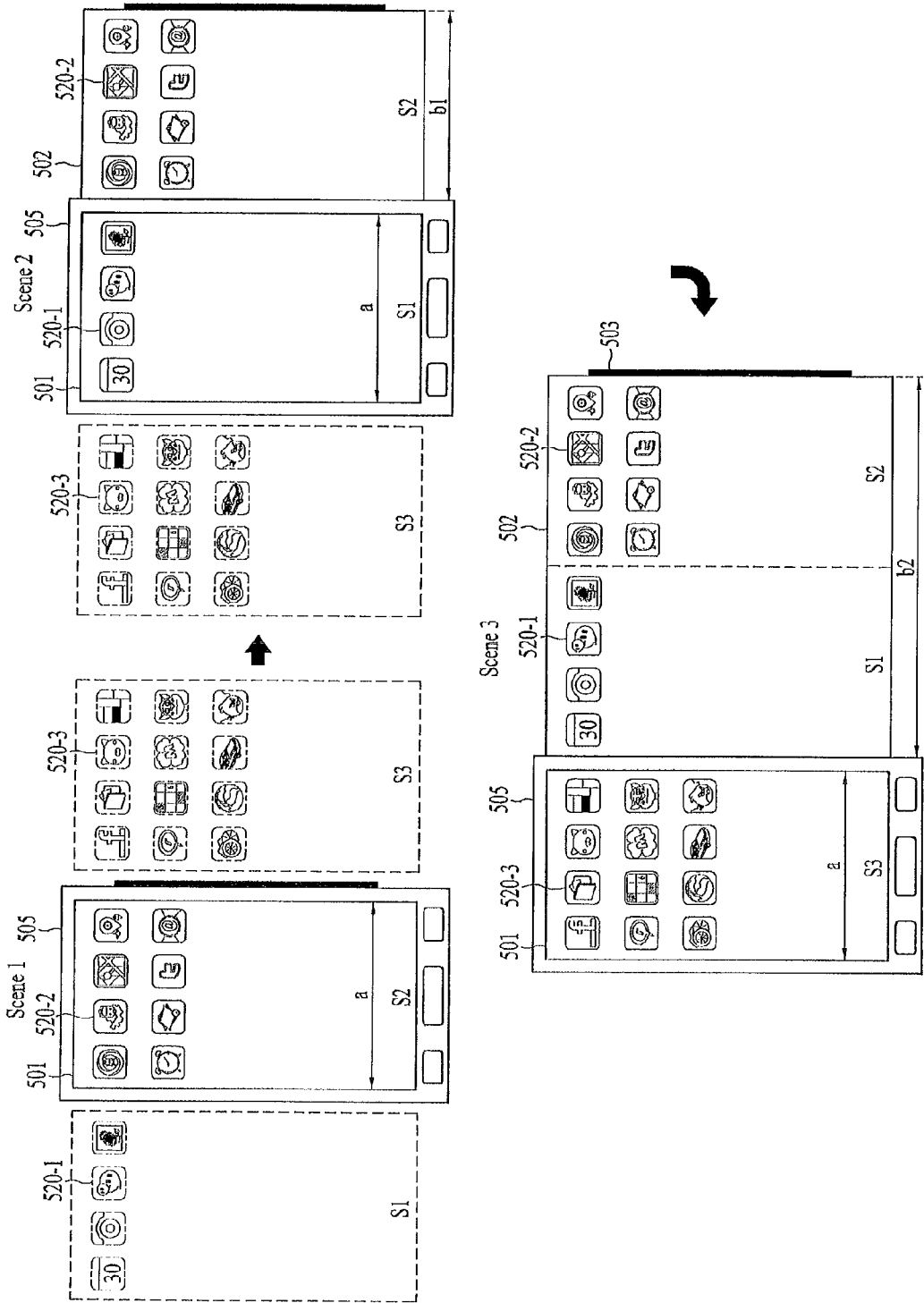
FIG. 5 illustrates an alternative set of scenes that describe a method for displaying a plurality of icon sheets as a flexible display is extended from within the display device, according to some embodiments of the present invention.

FIG. 5 also illustrates a situation where a second icon sheet S2 is originally displayed on the main display 501 while a flexible display remains stored within the display device body 505. In scene 1, the second icon sheet S2 that includes a plurality of application icons 520-2 is displayed on the main display 501. Not expressly displayed on the main display 501, but existing in the user interface, are first icon sheet S1 and third icon sheet S3. Icon sheets S1 and S3 are represented by the dashed lines to acknowledge that icon sheets S1 and S3 exists within the user interface, but are not currently displayed. The embodiments illustrated by FIG. 5 differs from the previous embodiments illustrated by FIG. 4 as the display of the second sheet S2 on the main display 501 does not remain on the main display 501 but is rather transitioned onto the flexible display 502 as the flexible display 502 is pulled out from the display device body 505.

The second scene of FIG. 5 depicts the flexible display 502 having been pulled out to a first length, b1, where the first length b1 is equal to at least the width length, a, of the main display 501. By pulling out the flexible display 502 to the first length, b1, additional display space is made available for displaying an additional icon sheet. In this case, pulling out the flexible display 502 to the first length, b1, results in the display of the second icon sheet S2 transitioning onto the flexible display 502 while the previously non-displayed first icon sheet S1 becomes displayed on the main display 501. It should be apparent that the first icon sheet S1 that was not previously displayed is the preceding icon sheet prior to the second icon sheet S2 according to a numerical order hierarchy. So according to the embodiments illustrated by FIG. 5, the second icon sheet S2 is seen to have been "pulled" onto the flexible display 502 as the flexible display 502 is pulled out from the display device body 505.

The third scene of FIG. 5 depicts the flexible display 502 having been pulled out to a second length, b2, where the second length is equal to at least two times the width length, a, of the main display 501. By pulling out the flexible display 502 to the second length, b2, additional display space is made available for displaying the remaining third icon sheet S3 that was not previously displayed in the second scene. In this case, by pulling out the flexible display 502 to the second length, b2, results in the display of the second icon sheet S2 and the first icon sheet S1 on the flexible display 502 while the third icon sheet S3 becomes displayed on the main display 501. It should be apparent that in this third scene of FIG. 5 the icon sheet that was previously displayed on the main display 501 is "pulled" onto the flexible display 502 as the flexible display 502 is continued to be pulled further from out the display device body 505. So in scene 3, the first icon sheet S1 that was previously displayed on the main display 501 when the flexible display 502 was pulled out to the first length, b1, is seen to have been transitioned onto the flexible display 502 as the flexible display 502 is extended out further. Thus the display transition that comes with the flexible display 502 being pulled out to the second length, b2, is that the icon sheet that was previously displayed on the main display 501 is transitioned to be displayed on the flexible display 502 as the flexible display 502 is pulled out further from the display device body 505. Preferably the user will hold onto the handle 503 when pulling out the flexible display 502.

Figure 6:
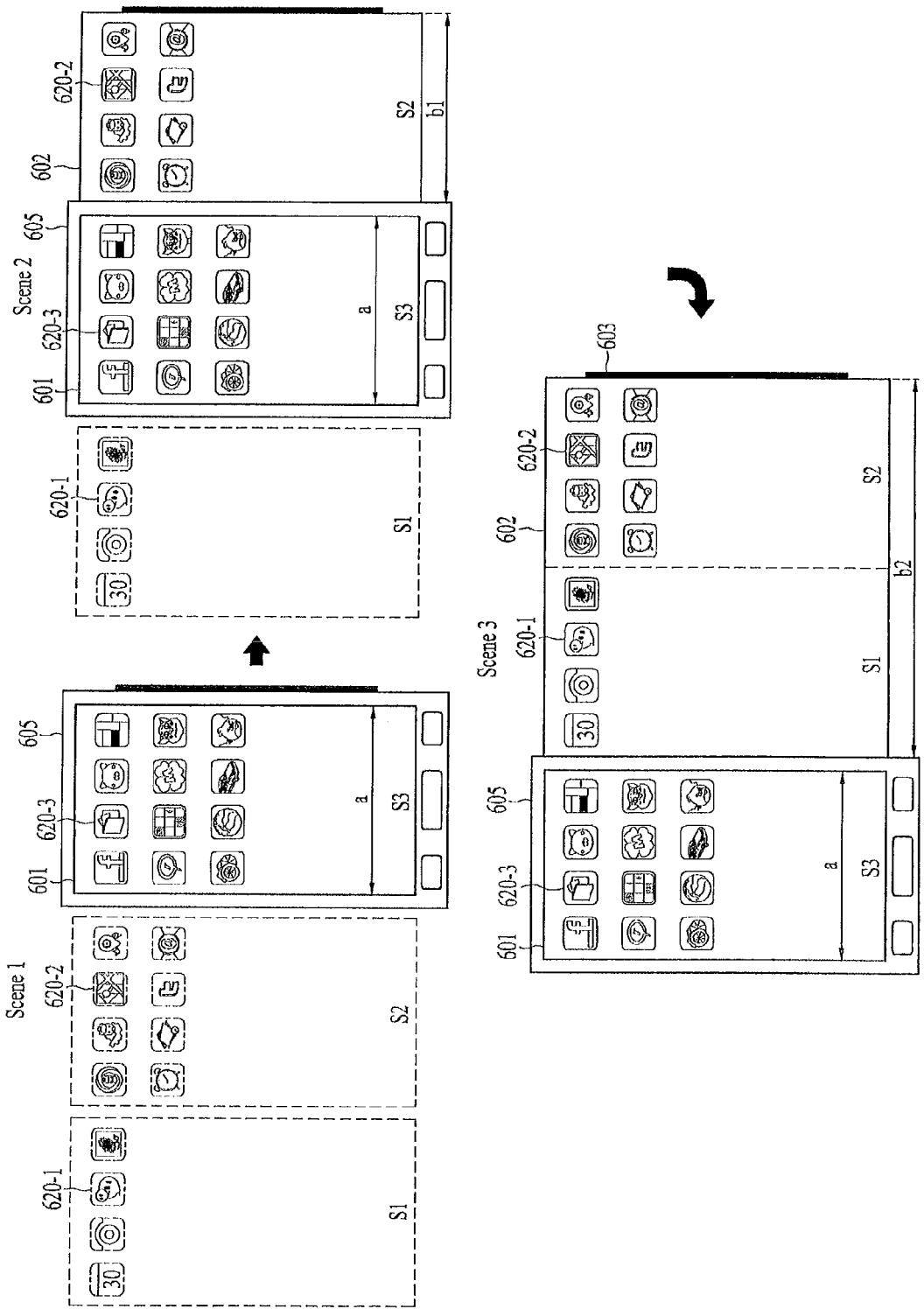
FIG. 6 illustrates an alternative set of scenes that describe a method for displaying a plurality of icon sheets as a flexible display is extended from within the display device, according to some embodiments of the present invention.

FIG. 6 illustrates a situation where a third icon sheet S3 is originally displayed on the main display 601 while a flexible display 602 remains stored within the display device body 605. In scene 1 the third icon sheet S3 that includes a plurality of application icons 620-3 is displayed on the main display 601. Not expressly displayed on the main display 601, but existing in the user interface, are first icon sheet S1 and second icon sheet S2. Icon sheets S1 and S2 are represented by the dashed lines to acknowledge that icon sheets S1 and S2 exists within the user interface, but are not currently displayed. The embodiment illustrated by FIG. 6 will maintain the third icon sheet S3 on the main display 601 as the flexible display 602 is pulled out from the display device body 605. The second scene of FIG. 6 depicts the flexible display 602 having been pulled out to a first length, b1, where the first length b1 is equal to at least the width length, a, of the main display 601. By pulling out the flexible display 602 to the first length, b1, additional display space is made available for displaying an additional icon sheet. In this case, pulling out the flexible display 602 to the first length, b1, results in the display of the third icon sheet S3 being maintained on the main display 601 while the previously non-displayed second icon sheet S2 becomes displayed on the flexible display 602. It should be apparent that the second icon sheet S2 that was not previously displayed is the preceding icon sheet prior to the third icon sheet S3 that was originally displayed on the main display 601 according to a numerical order hierarchy. So according to these embodiments, the second icon sheet S2 can be seen to have been "pulled" onto the flexible display 602 while the third icon sheet S3 continues to be displayed on the main display 601 as the flexible display 602 is pulled out from the display device body 605.

The third scene of FIG. 6 depicts the flexible display 602 having been pulled out to a second length, b2, where the second length is equal to at least two times the width length, a, of the main display 601. By pulling out the flexible display 602 to the second length, b2, additional display space is made available for displaying the remaining first icon sheet S1 that was not previously displayed in the second scene. In this case, pulling out the flexible display 602 to the second length, b2, results in the display of the second icon sheet S2 and the first icon sheet S1 on the flexible display 602 while the third icon sheet S3 remains displayed on the main display 601. It should be apparent that in this third scene of FIG. 6 the icon sheet that was previously displayed on the main display 601 is maintained on the main display 601 while previously non-displayed icons sheets are "pulled" onto the flexible display 602 as the flexible display 602 is continued to be pulled further from out the display device body 605. So in scene 3, the first icon sheet S1 that was n of previously displayed when the flexible display 602 was only pulled out to the first length, b1, is seen to have been displayed on the flexible display 602 as the flexible display 602 continued to be extended out further. Thus the change that comes with the flexible display 602 being pulled out to the second length, b2, is that the icon sheet that was previously displayed on the main display 601 is maintained on the main display 601 while previously non-displayed icon sheets are transitioned to be displayed on the flexible display 602.

Figure 7:
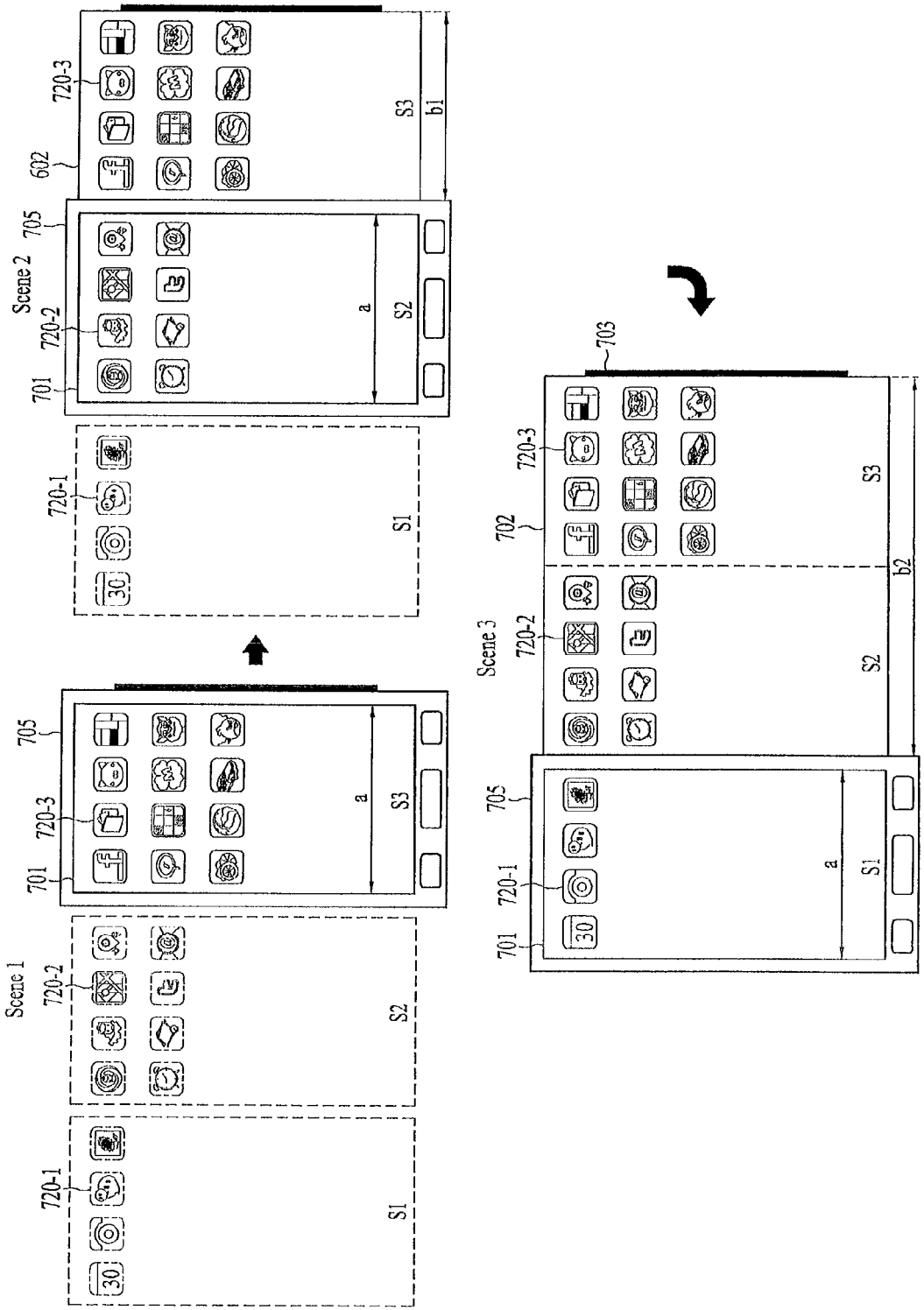
FIG. 7 illustrates an alternative set of scenes that describe a method for displaying a plurality of icon sheets as a flexible display is extended from within the display device, according to some embodiments of the present invention.

FIG. 7 also illustrates the situation where a third icon sheet S3 is originally displayed on the main display 701 while a flexible display 702 remains stored within the display device body 705. In scene 1, the third icon sheet S3 that includes a plurality of application icons 720-3 is displayed on the main display 701. Not expressly displayed on the main display 601, but existing in the user interface, are first icon sheet S1 and second icon sheet S2. Icon sheets S1 and S2 are represented by the dashed lines to acknowledge that icon sheets S1 and S2 exists within the user interface, but are not currently displayed. The embodiment illustrated by FIG. 7 envisions pulling along the icon sheet that was originally displayed on the main display 701, onto the flexible display 702 as the flexible display 702 is pulled out from within the display device body 705

The second scene of FIG. 7 depicts the flexible display 702 having been pulled out to a first length, b1, where the first length b1 is equal to at least the width length, a, of the main display 701. By pulling out the flexible display 702 to the first length, b1, additional display space is made available for displaying an additional icon sheet. In this case, pulling out the flexible display 702 to the first length, b1, results in the transition of the third icon sheet S3 onto the flexible display 702, while the previously non-displayed second icon sheet S2 becomes displayed on the main display 701. It should be apparent that the second icon sheet S2 that was not previously displayed is the preceding icon sheet prior to the third icon sheet S3 that was originally displayed on the main display 701 according to a numerical order hierarchy. So according to these embodiments, the third icon sheet S3 is seen to be "pulled" onto the flexible display 702 while the second icon sheet S2 transitions onto the main display 701 as the flexible display 702 is pulled out from the display device body 705.

The third scene of FIG. 7 depicts the flexible display 702 having been pulled out to a second length, b2, where the second length is equal to at least two times the width length, a, of the main display 701. By pulling out the flexible display 702 to the second length, b2, additional display space is made available for displaying the remaining first icon sheet S1 that was previously not displayed in the second scene. In this case, pulling out the flexible display 702 to the second length, b2, results in the display of the first icon sheet S1 to transition onto the main display 702 and the second icon sheet S2 to be pulled onto the flexible display 702. The third icon sheet S3 continues to be displayed on the flexible display 702 as in the second scene. It should be apparent that in this third scene of FIG. 7, the icon sheet that was previously displayed on the main display 701 is transitioned onto the flexible display 702 while a previously non-displayed icon sheet is newly displayed on the main display 701 as the flexible display 602 is continued to be pulled further from out the display device body 705. So in scene 3, the first icon sheet S1 that was not previously displayed when the flexible display 702 was only pulled out to the first length, b1, is seen to have been newly displayed on the main display 701 as the flexible display 702 continues to be extended out further. Thus the change that comes with the flexible display 702 being pulled out to the second length, b2, is that the icon sheet that was previously displayed on the main display 701 is transitioned onto the flexible display 702 while a previously non-displayed icon sheet is transitioned to be displayed on the main display 701.

Although the preceding description of the present invention allowed the transition of icon sheets to be triggered simply based on the measured length of the flexible display that was pulled out from within the display device body, according to some embodiments of the present invention a touch input may be detected as an additional factor for determining the transition of icon sheets as the flexible display is pulled out from within the display device body.

Figure 8:
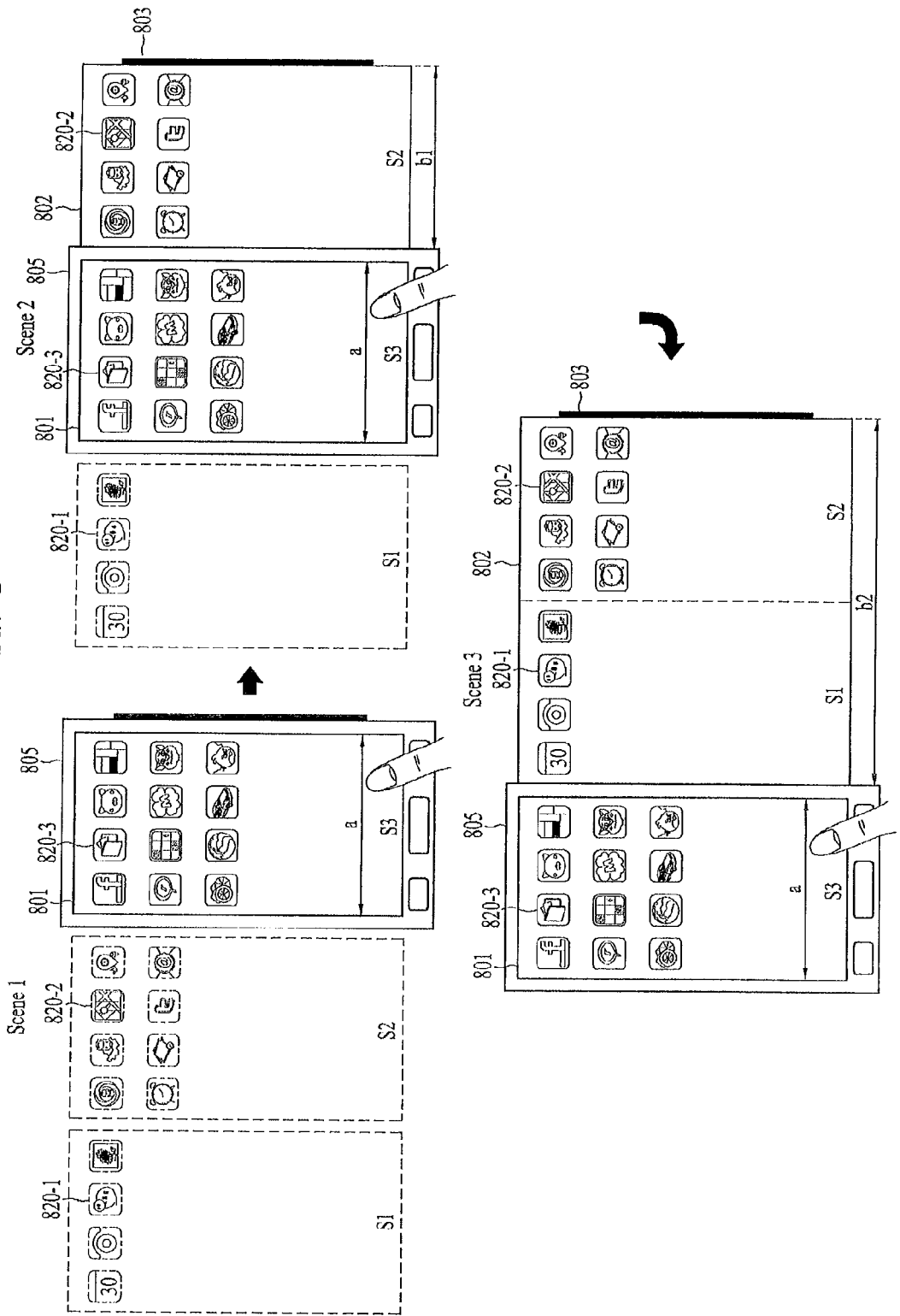
FIG. 8 illustrates an alternative set of scenes that describe a method for displaying a plurality of icon sheets as a flexible display is extended from within the display device that additionally utilizes a touch input contact on a main display, according to some embodiments of the present invention.

For instance, FIG. 8 illustrates a variety of scenes for depicting a user's touch input contact on the main display 801 as the flexible display 802 is being pulled out from the display device body 805. When the user's touch input is detected on the main display 801, this informs the processor 111 to maintain the display of the icon sheet that is currently displayed on the main display 801 while the previously non-displayed icon sheets are transitioned to be displayed on the flexible display 802 as the flexible display 802 is pulled out from the display device body 805. The user's touch input on the main display 801 can be thought of as an "anchor" for allowing the icon sheet currently displayed on the main display 801 to remain on the main display 801 even as the flexible display 802 is being pulled out.

In scene 1 of FIG. 8, the icon sheet currently displayed on the main display 801 is the third icon sheet S3. Also, the first icon sheet S1 and third icon sheet S3 are seen to exist but are not displayed while the flexible display 802 remains stored within the display device body 805, as indicated by the first icon sheet S1 and third icon sheet S3 being illustrated with dashed lines. Prior to initiating the pulling of the flexible display 802 out from within the display device body 805, a user may initiate a touch input contact on the main display 801. The user's touch input on the main display 801 is then detected, and as the user begins to pull the flexible display 802 out from within the display device body 805, the display of the third icon sheet S3 will remain on the main display as long as the touch input is detected on the main display 801.

Scene 2 illustrates how the user's touch input on the main display 801 will maintain the third icon sheet S3 on the main display as the previously non-displayed second icon sheet S2 is transitioned to be displayed on the flexible display 802 when the flexible display 802 is pulled out to a first length b1. The first length b1 is at least equal to a width length, a, of the main display 801. At this point the user may release the touch input contact on the main display 801 and operate the display device in the state where the flexible display 802 is pulled out to the first length. Or the user may continue to pull the flexible display 802 further out.

Scene 3 of FIG. 8 illustrates the state where the flexible display 802 has been pulled out to a second length, b2, where the second length is at least equal to twice the width length, a, of the main display 801. In order to maintain the third icon sheet S3 on the main display 801, the user must have maintained the touch input contact on the main display S3 from when the flexible display 802 is pulled out to the first length, b1, until the flexible display 802 is pulled out to the second length, b2. If the user's touch input contact is detected on the main display 801 from when the flexible display 802 is pulled out to the first length, b1, until the flexible display 802 is pulled out to the second length, b2, then the display of the third icon sheet S3 will be maintained on the main display 801.

Figure 9:
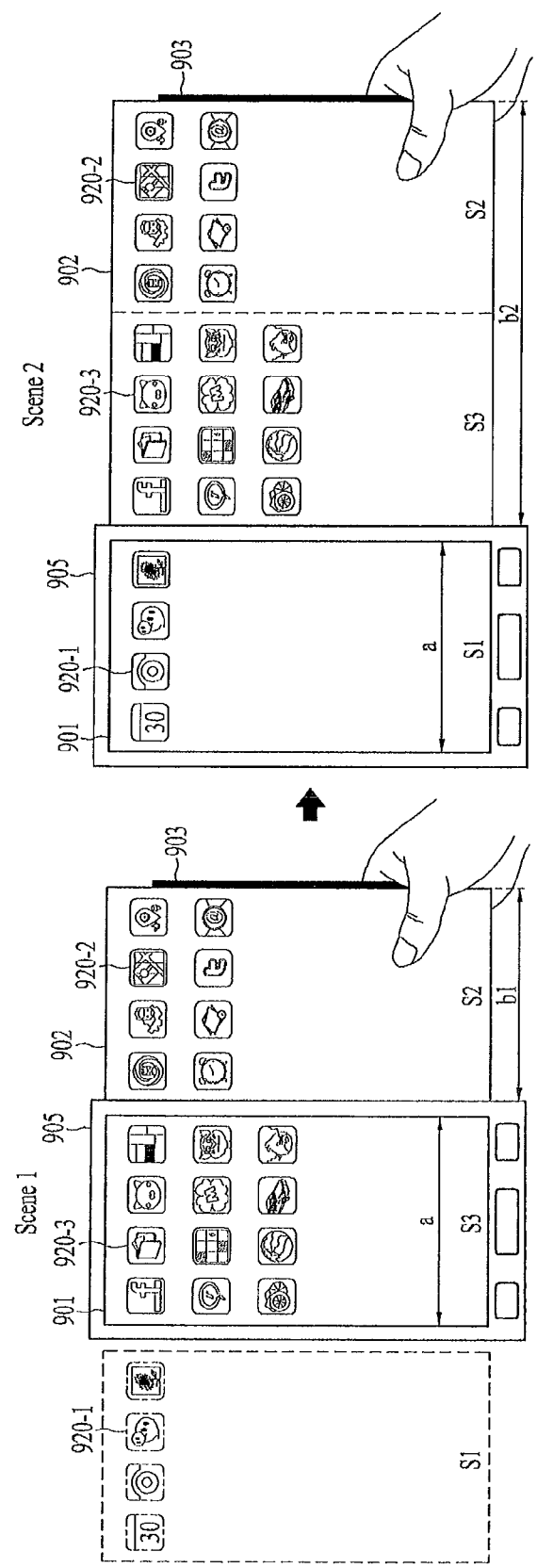
FIG. 9 illustrates an alternative set of scenes that describe a method for displaying a plurality of icon sheets as a flexible display is extended from within the display device that additionally utilizes a touch input contact on a flexible display, according to some embodiments of the present invention.

Furthermore, according to some embodiments of the present invention, the "anchor" like acting touch input described above is also available for use on the flexible display 902 as illustrated in FIG. 9. Referring now to FIG. 9, a user may wish to keep the second icon sheet S2 that is initially displayed on the flexible display 902 at a position that is closest to the handle 903, or put another way, at a position that is furthest from the main display 901. The first scene of FIG. 9 depicts the display device already in a state where the flexible display 902 has been pulled out to a first length, b1, where the first length is at least equal to a width length, a, of the main display 901.

So when the user decides to pull the flexible display 902 out further from within the display device body 905, the user may wish to keep the display of the second icon sheet S2 at the position on the flexible display 902 that is closest to the handle 903. To accomplish this, prior to pulling out the flexible display 902 further, the user may initiate a touch input contact on the flexible display 902 at a position that lays over the display of the second icon sheet S2. Then as the user begins to pull out the flexible display further out from the first length, b1, to a second length, b2, the user's touch input contact on the flexible display 902 will be detected. If the touch input contact is detected on the flexible display 902 from when the flexible display 902 is pulled out to the first length, b1, until the flexible display 902 is pulled out to the second length, b2, then the display of the second icon sheet S2 will remain on the flexible display 902 as depicted in scene 3. In this case, the display of the second icon sheet S2 is pulled along with the pulling out action of the flexible display 902.

Preferably, the user will simultaneously grab the handle 903 and contact the flexible device 902 with a touch input (e.g. with the user's thumb) over the icon sheet closest to the handle 903, as illustrated in FIG. 9 scene 1. Then the user will maintain (i.e. does not release the touch input contact) the touch input contact on the flexible display 902 until the flexible display is pulled out to the second length, b2. Then if the user's touch input is continually detected until the flexible display 902 is pulled out to the second length, b2, the icon sheet that was displayed closest to the handle 903 will remain in the same position on the flexible display 902. The result is illustrated in scene 2 of FIG. 9.

Figure 10:
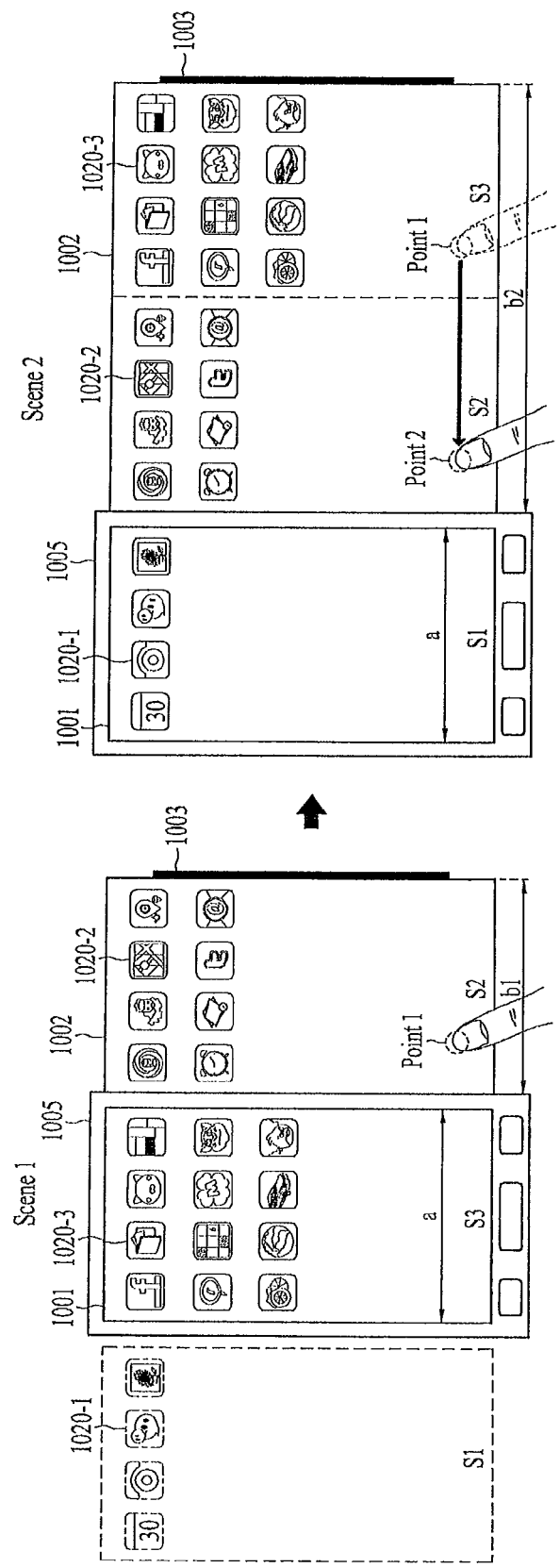
FIG. 10 illustrates an alternative set of scenes that describe a method for displaying a plurality of icon sheets as a flexible display is extended from within the display device that additionally utilizes a touch input contact on a flexible display, according to some embodiments of the present invention.

Alternatively, according to some embodiments of the present invention, the "anchor" like touch input described above is also available for keeping the place of an icon sheet on the flexible display 1002 as illustrated in FIG. 10. Referring now to FIG. 10, a user may wish to keep the second icon sheet S2 that is initially displayed on the flexible display 1002 at a same relative position on the flexible display 1002 even as the flexible display 1002 is pulled out. What is meant by relative position is that an icon sheet may be displayed to be positioned relative to a displayed position of another icon sheet or particular display. So for instance, FIG. 10 is illustrated as an example for controlling the display of the second icon sheet S2 to remain at a position that is immediately to the right of the icon sheet that is displayed on the main display 1001. The first scene of FIG. 10 depicts the flexible display 1002 already in a state where the flexible display 1002 has been pulled out to a first length, b1, where the first length is at least equal to a width length, a, of the main display 1001. The first scene of FIG. 10 also depicts the user's touch input contacting the flexible display over the second icon sheet S2, where the second icon sheet S2 is displayed immediately to the right of the main display 1001.

So then as the user decides to pull the flexible display 1002 out further from within the display device body 1005, the user may wish to keep the display of the second icon sheet S2 at the same relative position on the flexible display 1002 (i.e. to the immediate right of the main display). To accomplish this, prior to pulling out the flexible display 1002 further, the user may initiate a touch input contact on the flexible display 1002 at a position that lays over the display of the second icon sheet S2. Then as the user begins to pull out the flexible display further out from the first length, b1, to a second length, b2, the user's touch input may maintain contact on the flexible display 1002 by sliding on the flexible display 1002. If the touch input contact is detected on the flexible display 1002 over a relative area that constitutes the display of the second icon sheet S2 during the time that the flexible display 1002 is pulled out from the first length, b1, to the second length, b2, then the resulting display will maintain the relative position of the second icon sheet S2 to remain to the immediate right of the main display 1001 as illustrated in scene 2 of FIG. 10.

In this way, the user is able to maintain the display of the second icon sheet S2 at a relative position that remains next to the main display 1001, as opposed to the embodiment described in FIG. 9 that resulted in the display of the second icon sheet S2 at a position further away from the main display. Scene 1 illustrates the user contacting the flexible display 1002 at point 1, where point 1 hovers over a display of the second icon sheet S2. Scene 2 then better illustrates how the touch input contact according to these embodiments will result in the contact point of the touch input to actually slide from point 1 to point 2 on the flexible display 1002 as the flexible display 1002 is pulled out further.

Preferably, the user's touch input will contact the flexible display 1002 with one hand at point 1 while the other hand holds the handle 1003 to pull out the flexible display 1002. Then the user will maintain (i.e. does not release the touch input contact) the touch input contact from point 1 until point 2 on the flexible display 1002 until the flexible display 1002 is pulled out to the second length, b2. Visually the user will be maintaining the touch input over the display of the second icon sheet S2, but physically the touch input will be sliding across the flexible display 1002 as the flexible display 1002 is pulled out further. The successful result related to the embodiments described by FIG. 10 can be seen in scene 2 of FIG. 10.

According to another object of the present invention, indicators are provided for identifying an icon sheet hierarchy. Scene 1 of FIG. 11 displays a second indicator 1130-2 and a third indicator 1130-3 that are displayed on the main display 1101 and the flexible display 1102, respectively. The first icon sheet S1 is illustrated with dashed lines to represent that it exists within the user interface, but is not yet displayed. Each of the second indicator 1130-2 and third indicator 1130-3 are comprised of three circles, where the total number of circles represents the total number of icon sheets that exist within the user interface.

Figure 11:
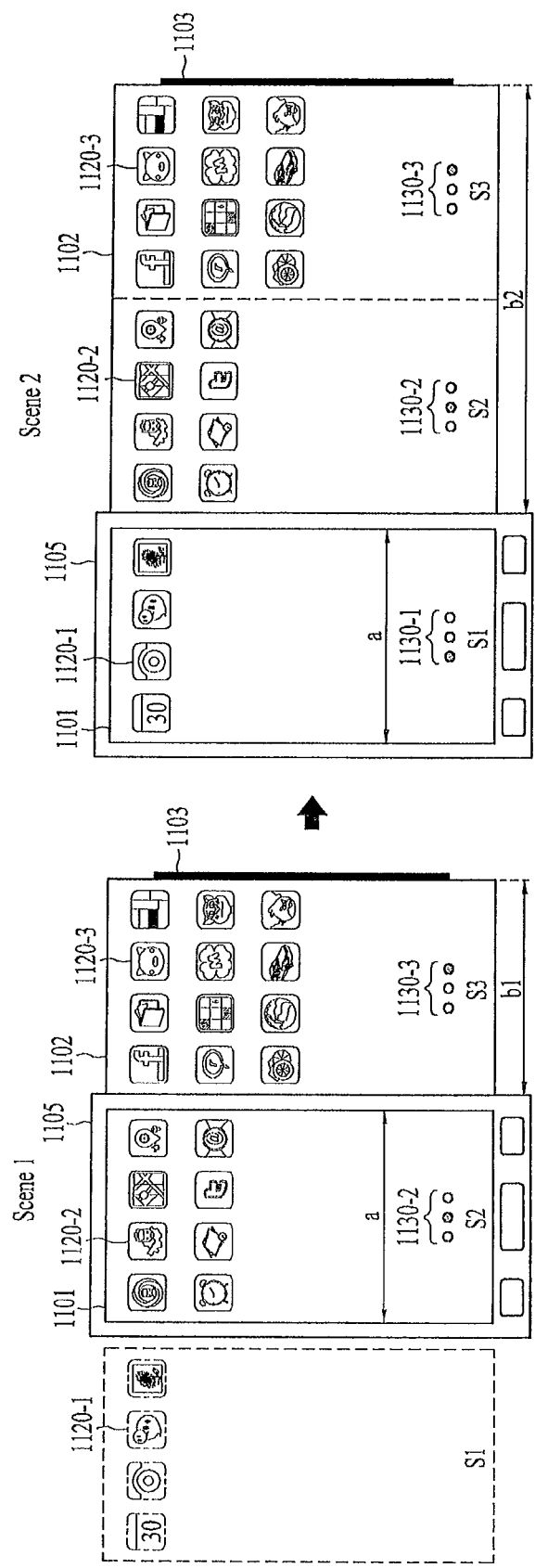
FIG. 11 illustrates a set of scenes that describe a method for displaying an indicator for indicating a currently displayed icon sheet, according to some embodiments of the present invention.

In scene 1 of FIG. 11 the second icon sheet S2 is displayed on the main display 1101 along with the second indicator 1130-2, where the second circle of the second indicator 1130-2 is highlighted. The highlighting of the second circle of the second indicator 1130-2 serves to identify that the second icon sheet S2 displayed on the main display 1101 is indeed the second icon sheet S2 out of three total icon sheets that exist in the user interface.

Similarly, the third icon sheet S3 is displayed on the flexible display 1102 along with the third indicator 1130-3, where the third circle of the third indicator 1130-3 is highlighted. The highlighting of the third circle of the third indicator 1130-3 serves to indicate that the icon sheet displayed on the flexible display 1102 is indeed the third icon sheet out of three total icon sheets that exist in the user interface.

Scene 2 of FIG. 11 illustrates the flexible display 1102 extended out to the second length, b2, where the second length b2 is at least equal to twice the width length, a, of the main display 1101. In the second scene, all three available icons sheets S1, S2 and S3 may be displayed between the main display 1101 and the flexible display 1102. Each icon sheet is displayed with a corresponding indicator that indicates the hierarchy position of the icon sheet.

For example, the first icon sheet S1 displayed on the main display 1101 is displayed along with a first indicator 1130-1 comprised of three circles, where the first circle is highlighted. In this way, the first indicator 1130-1 that is displayed along with the first icon sheet S1 is able to identify that the first icon sheet S1 is indeed the first icon sheet out of three total available icon sheets.

Similarly, the second icon sheet S2 displayed on the flexible display 1102 is displayed along with a second indicator 1130-2 comprised of three circles, where the second circle is highlighted. In this way, the second indicator 1130-2 that is displayed along with the second icon sheet S2 is able to identify that the second icon sheet S2 is indeed the second icon sheet out of three total available icon sheets.

And finally, the third icon sheet S3 displayed on the flexible display 1102 is displayed along with a third indicator 1130-3 comprised of three circles, where the third circle is highlighted. In this way, the third indicator 1130-3 that is displayed along with the third icon sheet S3 is able to identify that the third icon sheet S3 is indeed the third icon sheet out of three total available icon sheets.

Figure 12A:
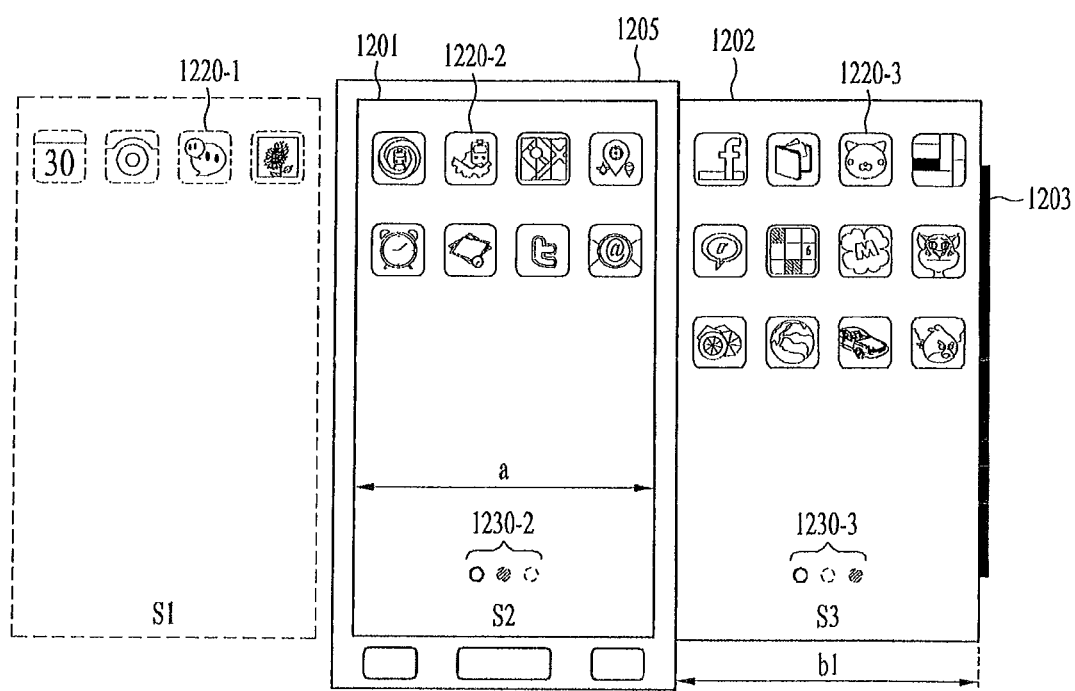
FIG. 12A illustrates an alternative scene that describe a method for displaying an indicator, according to some embodiments of the present invention.
Figure 12B:
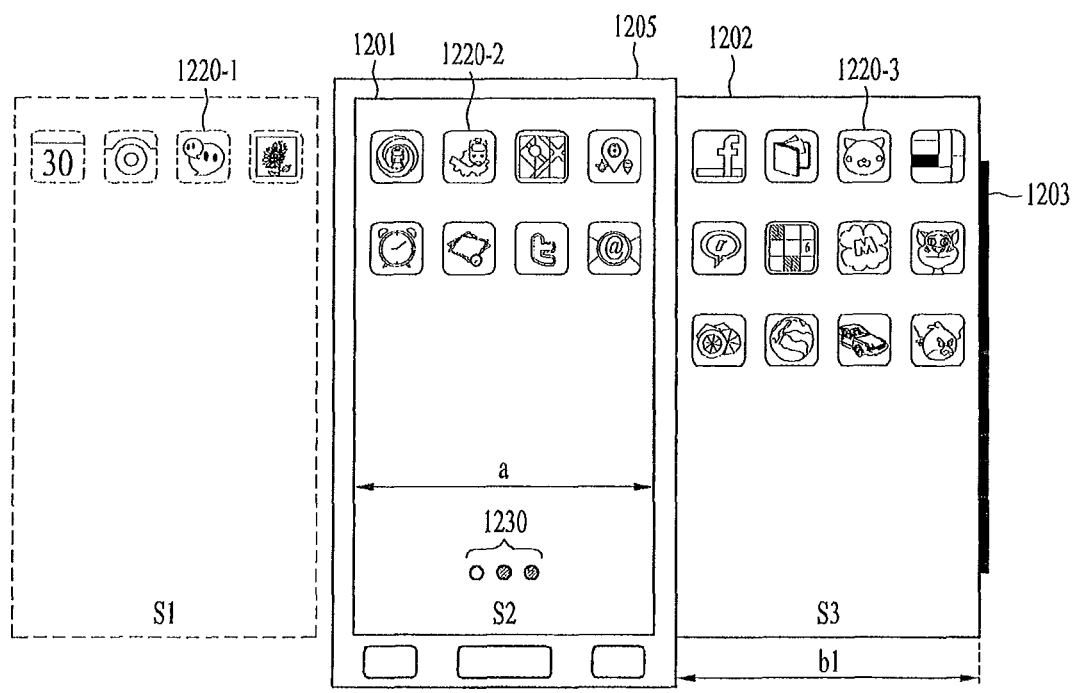
FIG. 12B illustrates an alternative scene that describe a method for displaying an indicator, according to some embodiments of the present invention.

Alternatively, in other embodiments of the present invention an indicator may be provided for indicating an icon sheets hierarchical place out of a total number of available icon sheets and for indicating a number of currently displayed icon sheets. FIGS. 12A and 12B illustrate an example of such embodiments.

FIG. 12A illustrates the display device having the flexible display 1202 extended out to a first length, b1, where the first length is equal to at least the width length, a, of the main display 1201. The first icon sheet S1 is illustrated with dashed lines to represent that it exists within the user interface, but is not yet displayed. Each of the second indicator 1230-2 and third indicator 1230-3 are comprised of three circles, where the total number of circles represents the total number of icon sheets that are currently being displayed.

In addition, the second icon sheet S2 is displayed on the main display 1201 along with the first indicator 1230-2, where the second circle out of three circles of the second indicator 1230-2 is highlighted to indicate that the icon sheet displayed on the main display 1201 is the second icon sheet out of three total icon sheets that are currently being displayed.

Similarly, the third icon sheet S3 is displayed on the flexible display 1202 along with the third indicator 1230-3, where the third circle out of three circles of the third indicator 1230-3 is highlighted to indicate that the icon sheet displayed on the flexible display 1202 is the third icon sheet out of two total icon sheets currently being displayed.

It should also be noticed that the second and third circles of both the second indicator 1230-2 and the third indicator 1230-3 are marked with a dashed circle. This additional marking is made to identify that the second icon sheet and the third icon sheet are the icon sheets that are currently being displayed out of the total three available icon sheets.

FIG. 12A also illustrates the flexible display 1202 extended out to the second length, b2, where the second length b2 is at least equal to twice the width length, a, of the main display 1201. In FIG. 12A, however, unlike the other embodiments where each icon sheet had its own corresponding indicator, only a single indicator 1230 is displayed on the main display 1201. The three circles of the indicator 1230 serve to identify that there are currently three icon sheets available (S1, S2 and S3). In addition, the second and third circles of the indicator 1230 are highlighted, where the highlighting serves to identify the second icon sheet S2 and the third icon sheet S3 as the icon sheets currently being displayed.

It should be apparent that although the indicator illustrated in FIG. 11 and FIG. 12 has been described as being comprised of circles, the indicator may be comprised of any number of shapes and forms. For instance, each indicator may be generally comprised of a number of parts, where the total number of parts corresponds to a total number of available icon sheets or a total number of currently displayed icon sheets. Also other means than the dashed markings illustrated in FIG. 12A may be implemented for identifying which of the icon sheets are currently being displayed. For instance hash markings may be used instead of the dashed outline markings.

FIGS. 13A-16 illustrate flowcharts describing exemplary steps for transitioning the display of icon sheets between a main display and a flexible display according to the present invention. It should be noted that for purposes of describing the flowcharts illustrated in FIGS. 13A-16 the first display may be considered to be the main display described throughout the description, and the second display may be considered to be the flexible display described throughout the description.

Figure 13A:
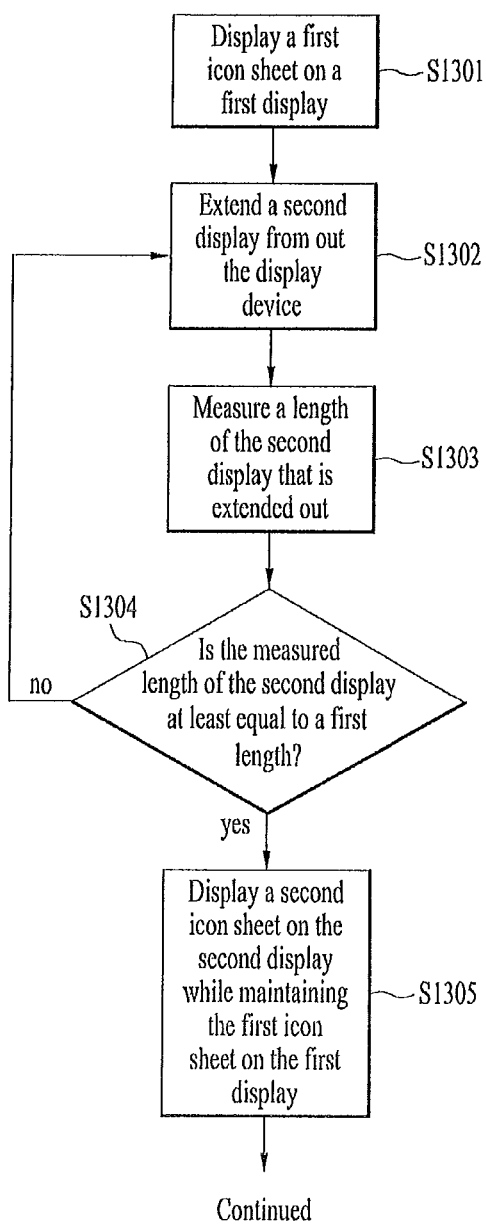
FIG. 13A illustrates a flowchart describing an exemplary set of steps for a method, according to some embodiments of the present invention.

FIG. 13A is a flowchart describing exemplary steps for transitioning the display of icon sheets between a first display and a second display according to some embodiments of the present invention. At step 1301, the display device is assumed to be in a state where only the first display is available for displaying objects as a second display is not yet extended out from within the display device. Therefore step 1301 describes only a first icon sheet is displayed on the first display of the display device. Preferably the first display is a main display that is found on a front side of the display device.

At step 1302 the user may begin to pull out the second display that was previously stored within the display device. And as the second display is pulled out from within the display device, a measuring unit will proceed to measure a length of the second display that is extended out from the display device as described in step 1303. Alternatively, the measuring unit may measure a length of the second display that remains within the display device.

Then at step 1304, a determination must be made as to whether the length of the second display that has been pulled out from within the display device is at least equal to a first length. The first length is preferably a width length of the first display. The first length must be at least equal to the width length of the first display because step 1304 is essentially the step that determines whether an icon sheet may be displayed on the second display. As all icon sheets are assumed to share the same size dimensions, it serves that if the first icon sheet may be displayed on the first display, the second display must at least be equal to the size of the first display in order to display an icon sheet on the second display.

Thus if it is determined at step 1304 that the measured length of the second display is at least equal to the width length of the first display, a second icon sheet will be newly displayed on the second display while the first icon sheet remains on the first display, as described in step 1305. If however it is determined at step 1304 that the measured length of the second display is not at least equal to the width length of the first display, then the user must continue to extend the second display from out the display device.

Figure 13B:
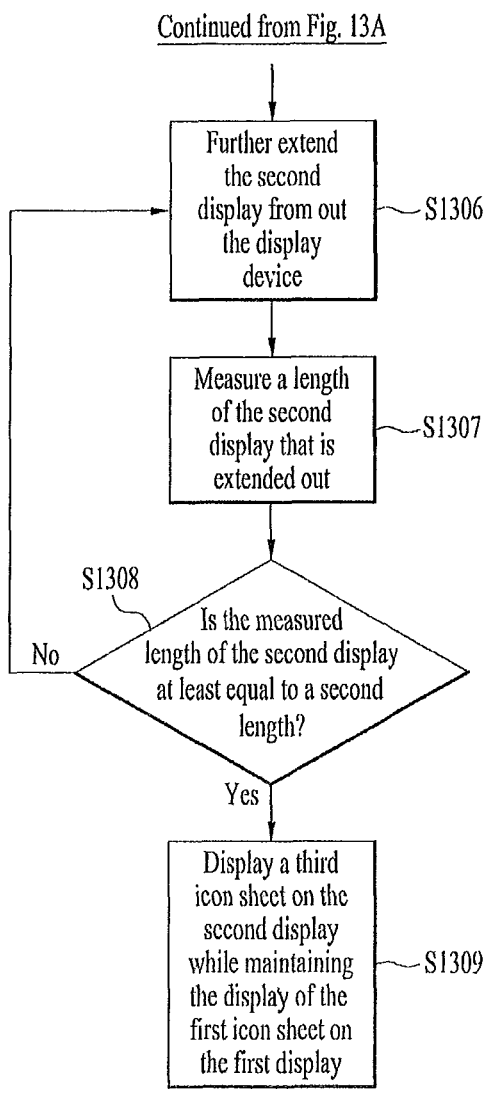
FIG. 13B illustrates a flowchart describing a continuation of exemplary steps for the method described in FIG. 13A, according to some embodiments of the present invention.

Now the user may operate the display device in this state where the first display and the second display are displaying the first icon sheet and the second icon sheet, respectively. Or the user is free to extend the second display further out from within the display device, in which case the operational steps proceed as illustrated in FIG. 13B.

At step 1306 the user is able to further extend the second display from within the display device. And at step 1307 the measuring unit is seen to continue measuring the length of the second display that is extended out from within the display device.

Then a determination is made at step 1308 as to whether the measured length of the second display is at least equal to a second length. The second length is preferably two times the width of the first display. The reason for this limitation is to ensure that at least two full icon sheets may be displayed on the newly extended second display. If it is determined that the measured length of the second display is at least equal to the second length, then a third icon sheet will be transitioned to be newly displayed on the second display while the first icon sheet remains on the first display, as described in step 1309. If however it is determined that the measured length of the second display is not at least equal to the second length, then the user will be required to continue extending the second display further.

Figure 14:
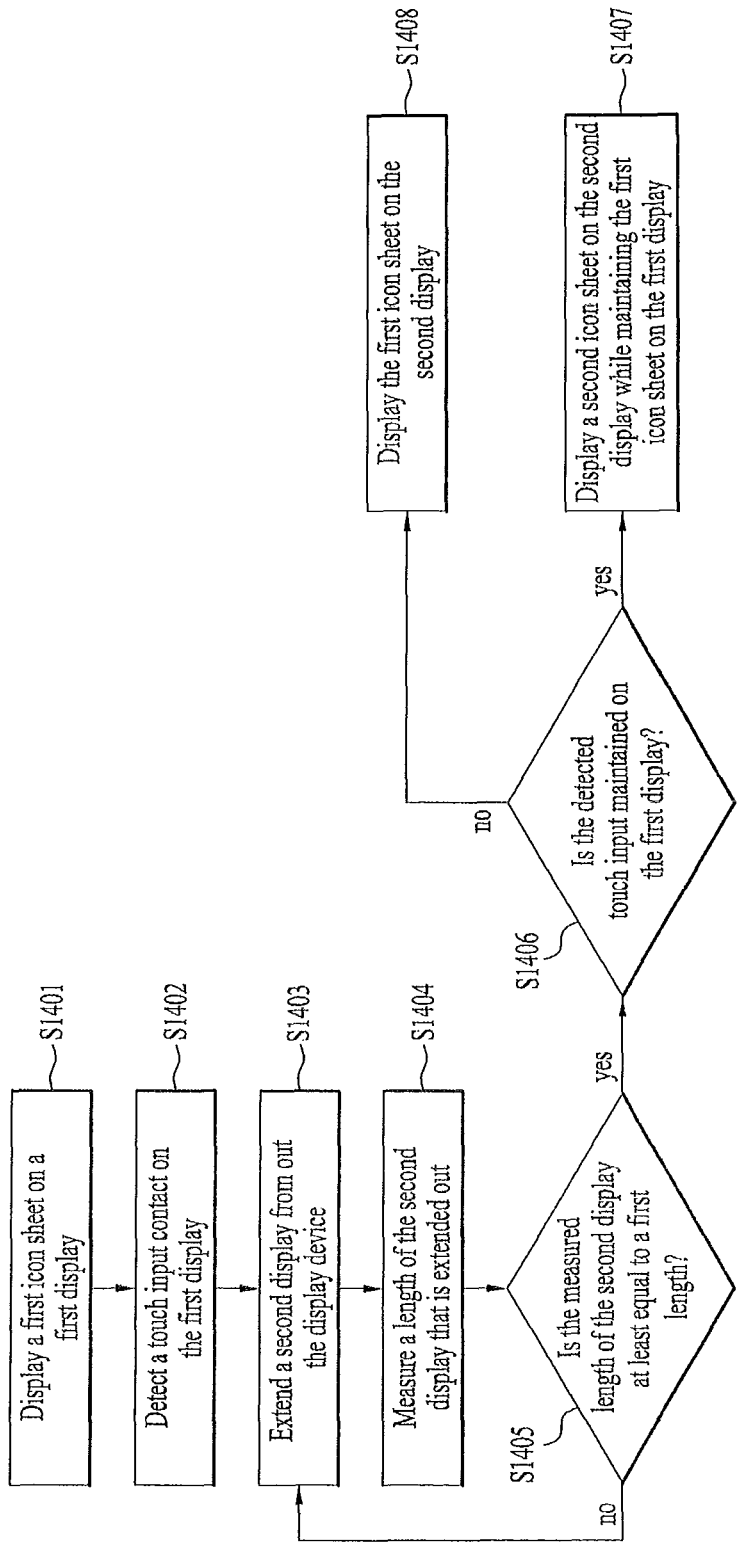
FIG. 14 illustrates a flowchart describing an exemplary set of steps for a method, according to some embodiments of the present invention.

FIG. 14 illustrates a flowchart describing the exemplary steps for transitioning icon sheets onto a second display that additionally takes into account a touch input contact made by a user on the first display.

At step 1401, a first icon sheet is displayed on the first display of the display device. In this state, only the first display is available for displaying objects as a second display is not yet extended out from within the display device.

At step 1402 a user will make contact on the first display that is currently displaying the first icon sheet. Preferably, the user's touch input contact will not overlap with a displayed icon of the first icon sheet.

At step 1403 the user may begin to pull out the second display that was previously stored within the display device. And as the second display is pulled out from within the display device, a measuring unit will proceed to measure a length of the second display that is extended out from the display device as described in step 1404. Alternatively, the measuring unit may measure a length of the second display that remains within the display device.

Then at step 1405, a first determination must be made as to whether the length of the second display that has been pulled out from within the display device is at least equal to a first length. The first length is preferably the width length of the first display. The first length must be at least equal to the width length of the first display because step 1405 is essentially the step that determines whether the second display can support the display of an icon sheet. As all icon sheets share the same size dimensions, it serves that the second display must at least be equal to the size of the first display in order to display an icon sheet on the second display.

Further, a second determination must be made at step 1406 as to whether the user's touch input contact has been maintained on the first display. The user's continued contact on the first display can be seen as an anchor that serves to maintain the display of the first icon sheet on the first display. If the user's touch input contact on the first display is released prior to the second display reaching the first length, then step 1408 describes how the first icon sheet may be transitioned to be displayed on the second icon sheet instead of remaining on the first display.

However, if it is first determined at step 1405 that the second display has reached the first length and secondly determined at step 1406 that the user's touch input contact has been maintained, then step 1407 describes how the first icon sheet will stay on the first display and a second icon sheet may be newly displayed on the second display.

Figure 15A:
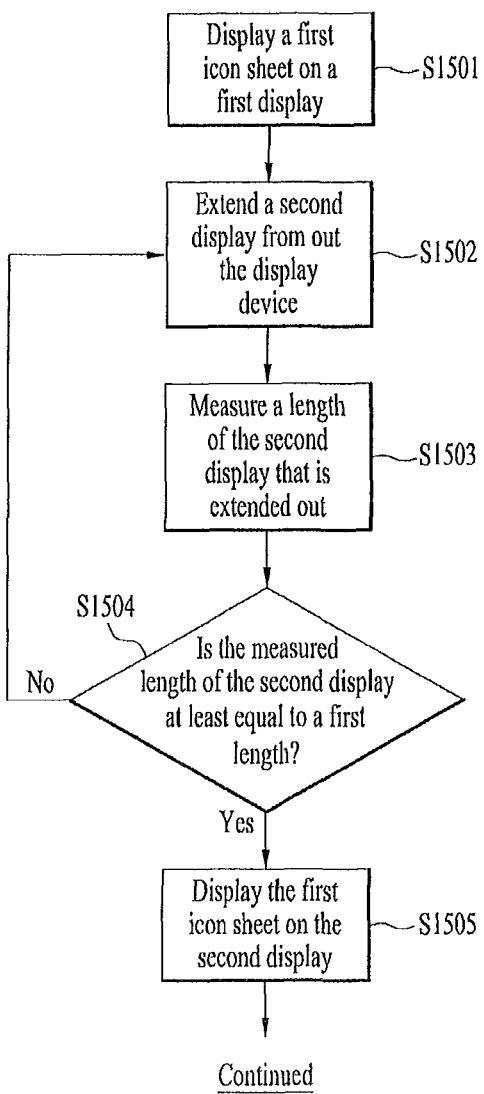
FIG. 15A illustrates a flowchart describing an exemplary set of steps for a method, according to some embodiments of the present invention.
Figure 15B:
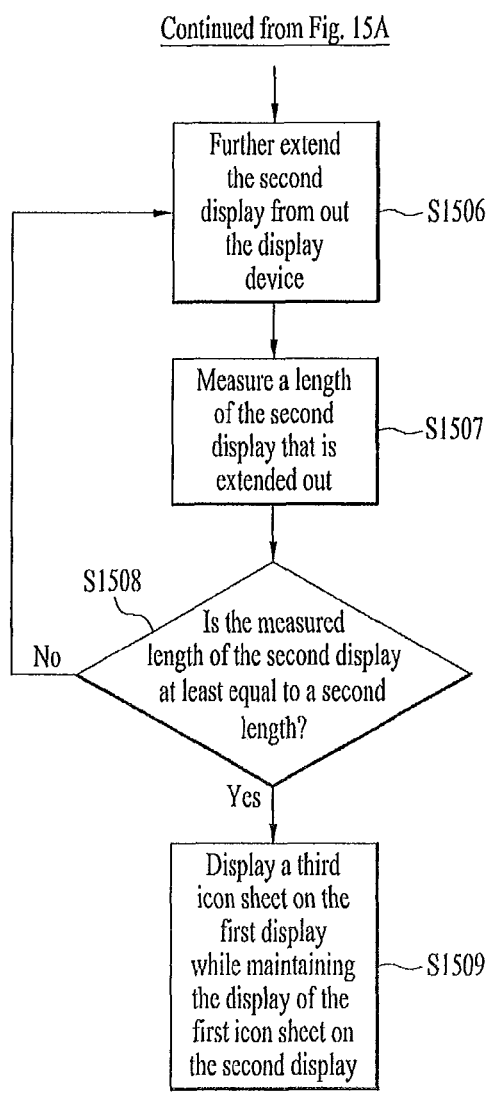
FIG. 15B illustrates a flowchart describing a continuation of exemplary steps for the method described in FIG. 15A, according to some embodiments of the present invention.

FIG. 15A is a flowchart describing another set of exemplary steps for transitioning the display of icon sheets between a first display and a second display according to some embodiments of the present invention. At step 1501, a first icon sheet is displayed on the first display of a display device. Preferably the first display is a main display that is found on a front side of the display device. In this state, only the first display is available for displaying objects as a second display is not yet extended out from within the display device.

At step 1502 the user may begin to pull out the second display that was previously stored within the display device. And as the second display is pulled out from within the display device, a measuring unit will proceed to measure a length of the second display that is extended out from the display device as seen in step 1503. Alternatively, the measuring unit may measure a length of the second display that remains within the display device.

Then at step 1504, a determination must be made as to whether the length of the second display that has been pulled out from within the display device is at least equal to a first length. The first length is preferably the width length of the first display. The first length must be at least equal to the width length of the first display because step 1504 is essentially the step that determines whether the second display can support displaying an icon sheet. As all icon sheets share the same size dimensions, it serves that the second display must at least be equal to the size of the first display in order to display an icon sheet on the second display.

Thus if it is determined at step 1504 that the measured length of the second display is at least equal to the width length of the first display, the first icon sheet will be transitioned to be displayed on the second display, as described in step 1505. If however it is determined at step 1504 that the measured length of the second display is not at least equal to the width length of the first display, then the user must continue to extend the second display from out the display device.

Now the user may operate the display device in this state where the first display and the second display are displaying the second icon sheet and the first icon sheet, respectively. Or the user is free to extend the second display further out from within the display device, in which case the operational steps proceed as illustrated on FIG. 15B.

At step 1506 the user is able to further extend the second display from within the display device. And at step 1507 the measuring unit is seen to continue measuring the length of the second display that is extended out from within the display device.

Then a determination is made at step 1508 as to whether the measured length of the second display is at least equal to a second length. The second length is preferably two times the width of the first display. The reason for this limitation is to ensure that at least two full icon sheets can be displayed on the newly extended second display. If it is determined that the measured length of the second display is at least equal to the second length, then a third icon sheet will be newly displayed on the first display while the display of the first icon sheet remains on the second display. If however it is determined that the measured length of the second display is not at least equal to the second length, then the user will be required to continue extending the second display further.

FIG. 16 illustrates a flowchart describing another set of exemplary steps for transitioning icon sheets between a first display and a second display that additionally takes into account a touch input contact made by a user on the second display.

At step 1601, the display device is in the state where the second display has been extended out to at least the first length, where the first length is preferably the width length of the first display. So in this state, a first icon sheet is displayed on the second display and a second icon sheet is displayed on the first display.

At step 1602 a user will make contact on the second display that is currently displaying the first icon sheet. Preferably, the user's touch input contact will not overlap with a displayed icon of the first icon sheet.

At step 1603 the user may begin to pull out the second display even further. And as the second display is pulled out from within the display device, a measuring unit will proceed to measure a length of the second display that is extended out from the display device as described in step 1604. Alternatively, the measuring unit may measure a length of the second display that remains within the display device.

Then at step 1605, a first determination must be made as to whether the length of the second display that has been pulled out from within the display device is at least equal to a second length. The second length is preferably two times the width length of the first display.

Further, a second determination must be made at step 1606 as to whether the user's touch input contact has been maintained on the second display. The user's continued contact on the second display can be seen as an anchor that serves to maintain the display of the first icon sheet on the second display. Only when it is first determined at step 1605 that the second display has reached the second length and second determined at step 1606 that the user's touch input contact has been maintained, may the first icon sheet continued to be displayed on the second display as described in step 1607. Step 1607 also describes that a new third icon sheet may be newly displayed on the first display.

Although the flowchart illustrated in FIG. 16 does not specifically describe the events that may occur if the user's touch input contact on the second display is released prior to the second display reaching the second length, a variety of consequences may occur. For instance the first icon sheet that was displayed on the second display may be transitioned to be displayed on the first display. Or the first icon sheet may change positions on the second display so that both the first icon sheet and the new third icon sheet share the second display.

It will be apparent to those skilled in the art that various modifications and variations can be made in the present invention. Thus, although the foregoing description has been described with reference to specific examples and embodiments, these are not intended to be exhaustive or to limit the invention to only those examples and embodiments specifically described.

What is claimed is:

1. A method of controlling a display of a plurality of icon sheets on a display device with a first display and a second display, the method comprising:
    displaying a first icon sheet on the first display;
    detecting a touch input contact on the first display;
    exposing the second display for display, wherein the second display is provided by a flexible display;
    measuring a length of the second display that is exposed for display;
    displaying the first icon sheet on the second display while displaying a second icon sheet on the first display, when the measured length of the second display that is exposed is a first length, and the touch input contact is not continually detected on the first display until the second display is exposed to the first length; and
    displaying the second icon sheet on the second display while maintaining the display of the first icon sheet on the first display, when the measured length of the second display is exposed to the first length and the touch input contact is continually detected on the first display until the second display is exposed to the first length.

2. The method of claim 1, wherein the second display is stored within a housing unit and pulled out from within the housing unit.

3. The method of claim 1, further comprising:
    displaying an indicator on the first display configured to indicate the first icon sheet is displayed on the first display out of a total number of available icon sheets.

4. The method of claim 3, wherein the indicator is only displayed on the first display.

5. The method of claim 3, wherein the indicator further indicates a number of currently displayed icon sheets.

6. The method of claim 1, wherein the first length is at least equal to a width length of the first display.

7. The method of claim 6, wherein only a portion of the second icon sheet is displayed on the second display when the measured length of the second display that is exposed is less than the first length.

8. The method of claim 1, further comprising:
displaying a third icon sheet on the second display when the second display is further exposed to a second length; and maintaining the display of the first icon sheet on the first display.

9. The method of claim 8, wherein the second length is at least equal to twice a width length of the first display.

10. A method of controlling a display of a plurality of icon sheets on a display device with a first display and a second display, the method comprising:
displaying a first icon sheet on the first display, wherein the second display is provided by a flexible display;
detecting a touch input contact on the first display, wherein the touch input contact overlaps the display of the first icon sheet;
exposing the second display;
measuring a length of the second display that is exposed for display;
displaying the first icon sheet on the second display when the measured length of the second display that is exposed is a first length, and the touch input contact is not continually detected on the first display; and
displaying a third icon sheet on the second display while maintaining the display of the first icon sheet on the first display, when the second display is exposed to a second length and the touch input contact is continually detected on the first display until the second display is exposed to the second length.

11. The method of claim 10, wherein the first length is at least equal to a width length of the first display.

12. The method of claim 10, further comprising:
displaying a third icon sheet on the first display when the second display is further exposed to a second length; and maintaining the display of the first icon sheet on the second display.

13. The method of claim 10, wherein the second length is at least equal to twice a width length of the first display.

14. A display device, comprising:
a first display on a body of the display device, the first display configured to display a first icon sheet;
a second display provided by a flexible display;
a touch detecting unit configured to detect a touch input contact on the first display;
a measuring unit configured to measure a length of the second display that is exposed for display, and
a processor configured to control the second display to display the first icon sheet while displaying a second icon sheet on the first display, when the second display is exposed to a first length and the touch input contact is not continually detected on the first display until the second display is exposed to the first length, and
to control the second display to display a the second icon sheet on the second display while maintaining the display of the first icon sheet on the first display, when the measured length of the second display is exposed is at least equal to the first length and the touch detecting unit continually detects the touch input contact on the first display until the second display is exposed to the first length.

15. The display device of claim 14, wherein the second display is housed within a housing unit, and the second display is exposed by pulling the second display out from within the housing unit.

16. The display device of claim 14, wherein the first length is at least equal to a width length of the first display.

17. A display device, comprising:
a first display on a body of the display device, the first display configured to display a first icon sheet;
a second display provided by a flexible display;
a touch input detecting unit configured to detect a touch input contact on the first display, wherein the touch input contact overlaps the display of the first icon sheet;
a measuring unit configured to measure a length of the second display that is exposed for display; and
a processor configured to control the second display to display the first icon sheet when the second display is exposed to a first length and the touch input detecting unit does not continually detect the touch input contact on the first display, and to control the first display to display a third icon sheet on the second display while maintaining the display of the first icon sheet on the first display, when the measured length of the second display, that is exposed is the second length, and the touch input detecting unit continually detects the touch input contact on the first display until the second display is exposed to the second length.

18. The display device of claim 17, wherein the second display is housed within a housing unit, and the second display is exposed by pulling the second display out from within the housing unit.

19. The display device of claim 17, wherein the first length is at least equal to a width length of the first display.

* * * * *